US006219347B1

(12) United States Patent
Uchida et al.

(10) Patent No.: US 6,219,347 B1
(45) Date of Patent: Apr. 17, 2001

(54) MOBILE COMMUNICATION SYSTEM

(75) Inventors: Yoshinori Uchida; Kuniyuki Suzuki, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/242,250

(22) PCT Filed: Aug. 8, 1997

(86) PCT No.: PCT/JP97/02790

§ 371 Date: Dec. 2, 1999

§ 102(e) Date: Dec. 2, 1999

(87) PCT Pub. No.: WO99/08463

PCT Pub. Date: Feb. 18, 1999

(51) Int. Cl.[7] .................................................. H04J 13/00
(52) U.S. Cl. ........................................ 370/347; 370/342
(58) Field of Search .................................... 370/342, 320, 370/324, 347, 441, 442, 465, 332, 311, 319, 321, 329, 331, 333, 334, 335–338, 341, 349, 348; 455/38.3, 522, 422, 560, 436; 375/130, 140

(56) References Cited

U.S. PATENT DOCUMENTS 5,365,544   11/1994   Schilling .
5,440,561   8/1995   Werronen .
5,506,864   4/1996   Schilling .
6,026,081 * 2/2000   Hamabe ............................... 370/342
6,044,073 * 3/2000   Seshadsi et al. ..................... 370/342
6,047,020 * 4/2000   Hottinen ............................... 370/342

FOREIGN PATENT DOCUMENTS 746660   2/1995   (JP) .
823569   1/1996   (JP) .
833037   2/1996   (JP) .
9618277  6/1996   (WO) .

* cited by examiner

Primary Examiner—Dang Ton
(74) Attorney, Agent, or Firm—Rothwell, Figg, Ernst & Manbeck

(57) ABSTRACT

A mobile communication system wherein a mobile station measures the distances between the mobile station and a plurality of adjacent radio base stations each from a time difference, eliminated by a fixed time difference, between the top time position of a time-divided CDMA burst signal received from a radio base station and the top time position of a time-divided CDMA burst signal transmitted to the radio base station in response to an instruction from the radio base station so that the top of the time-divided CDMA burst signal may come to the top time position of a time slot, and utilizes a result of the measurement for a hand-over discrimination, and frame synchronization between the radio base stations is established with a high degree of accuracy so that a plurality of radio base stations may operate in a same frame synchronization condition.

30 Claims, 23 Drawing Sheets

FIG. 11

| SPEECH CHANNEL NUMBER | SUB-SCRIBER NUMBER | MOBILE STATION POSITION ZONE NUMBER | TIME SLOT NUMBER | FRE-QUENCY CHANNEL NUMBER | TRANS-MISSION TYPE | TDMA: SYNCHRO-NIZATION WORD, CDMA: CODE NUMBER | BASE STATION NUMBER: RECEPTION ELECTRIC FIELD STRENGTH | MOBILE STATION NUMBER: TRANS-MISSION POWER | MOBILE STATION NUMBER: RECEPTION ELECTRIC FIELD STRENGTH | BASE STATION NUMBER: TRANS-MISSION POWER | BASE STATION NUMBER: DISTANCE INFORMATION FROM BASE STATION, UNIT(m) |
|---|---|---|---|---|---|---|---|---|---|---|---|
| 1060 | All | 11-13 | 0 | 3 | CDMA | 64060 | BS1:1 | - | - | BS1:3 | |
| 1061 | All | 11-13 | 0 | 6 | TDMA | SyW1 | BS1:1 | - | - | BS1:3 | |
| 1070 | All | 21-23 | 0 | 3 | CDMA | 64070 | BS2:1 | - | - | BS2:3 | |
| 1071 | All | 21-23 | 0 | 6 | TDMA | SyW2 | BS2:1 | - | - | BS2:3 | |
| 1032 | 32M | 13 | 1 | 3 | CDMA | 64032 | BS1:1 | MS32:1 | MS32:1 | BS1:1 | BS1:50 |
| 1062 | 32M | 22 | 2 | 3 | CDMA | 64032 | BS2:1 | MS32:2 | MS32:1 | BS2:2 | BS2:100 |
| 1082 | 32M | 33 | 3 | 3 | CDMA | 64032 | BS3:1 | MS32:3 | MS32:1 | BS3:3 | BS3:200 |

NOTE 1 : THE RECEPTION ELECTRIC FIELD STRENGTH IS REPRESENTED IN THE FOLLOWING FOUR STAGES
3 : MAXIMUM CLASS RECEPTION STRENGTH, 2 : MIDDLE DEGREE RECEPTION STRENGTH,
1 : OPTIMUM RECEPTION STRENGTH, 0 : NO SIGNAL

NOTE 2 : THE TRANSMISSION POWER STRENGTH IS REPRESENTED IN THE FOLLOWING FOUR STAGES
3 : MAXIMUM CLASS TRANSMISSION POWER, 2 : MEDIUM DEGREE TRANSMISSION POWER,
1 : MINIMUM CLASS TRANSMISSION POWER, 0 : NO TRANSMISSION

NOTE 3 : MOBILE STATION MS32 INDICATES THAT THREE SPEECH CHANNELS ARE CONNECTED TO THREE BASE STATIONS BS1, BS2, BS3 SIMULTANEOUSLY, BUT IN DIFFERENT TIME SLOTS
(AN EXAMPLE OF PROCESSING UPON HAND-OVER)

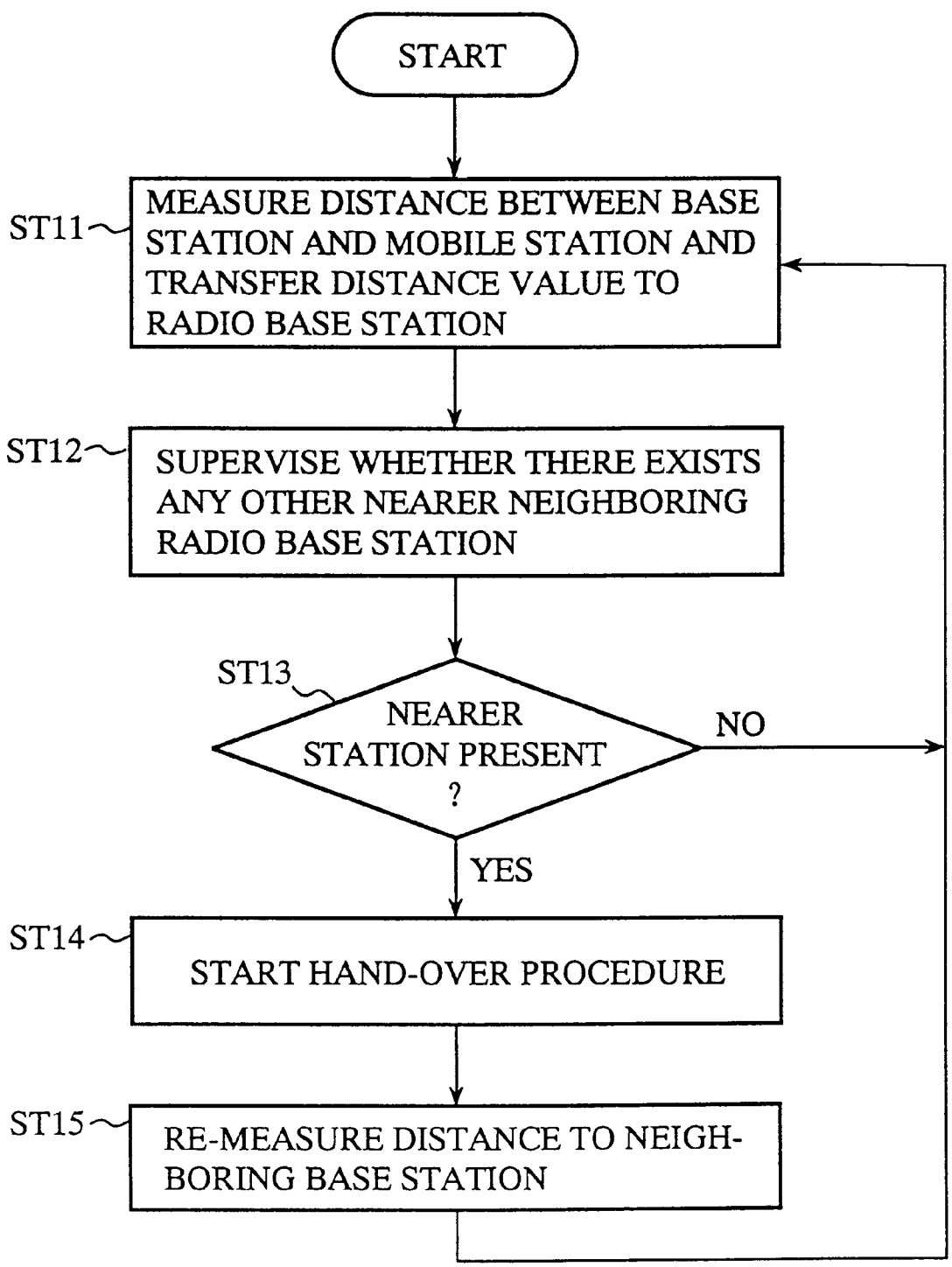

FIG.14

| | | $T_0$-1 | $R_0$-1 | $T_0$-2 | $R_0$-2 | $T_0$-3 |
|---|---|---|---|---|---|---|
| BS1 | TDMA CONTROL CHANNEL | TX | *RX | RX | *RX | TX |
| | TIME-DIVIDED CDMA CONTROL CHANNEL | TX | *RX | RX | *RX | TX |
| BS2 | TDMA CONTROL CHANNEL | RX | *RX | TX | *RX | RX |
| | TIME-DIVIDED CDMA CONTROL CHANNEL | RX | *RX | TX | *RX | RX |
| BS3 | TDMA CONTROL CHANNEL | TX | *RX | RX | *RX | TX |
| | TIME-DIVIDED CDMA CONTROL CHANNEL | TX | *RX | RX | *RX | TX |

NOTE 1 : $T_0$ DENOTES 0TH TRANSMISSION TIME SLOT OF TDD. IN THIS TIME SLOT, BASE STATION TRANSMITS CONTROL CHANNEL, BUT IN THE SCHEME ABOVE, TDMA AND TIME-DIVIDED CDMA ALTERNATELY PERFORM RECEPTION AND TRANSMISSION IN TIME SLOT $T_0$. HERE, RECEPTION REPRESENTS THE FUNCTION OF RECEIVING CONTROL CHANNEL OF ANY OTHER BASE STATION FOR FRAME SYNCHRONIZATION BETWEEN BASE STATIONS.

NOTE 2 : TABLE ABOVE REPRESENTS CASE WHEREIN BS2 RECEIVES CONTROL CHANNEL OF BS1 AND BS3 RECEIVES CONTROL CHANNEL OF BS2.

NOTE 3 : IN THE SCHEME ABOVE, WHEN BASE STATION BS RECEIVES TIME-DIVIDED CDMA CONTROL CHANNEL AND TDMA CONTROL CHANNEL, TIME-DIVIDED CDMA SPEECH CHANNEL AND TDMA SPEECH CHANNEL CANNOT BE TRANSMITTED IN THIS TIME SLOT. ACCORDINGLY, IN $T_0$ TIME SLOT, TIME-DIVIDED CDMA SPEECH CHANNEL AND TDMA SPEECH CHANNEL ARE ALLOCATED FOR HALF RATE USE IN WHICH EVERY OTHER TIME SLOT IS USED.

NOTE 4 : IN TABLE ABOVE, $T_0$-1 DENOTES FIRST FRAME $T_0$ TIME SLOT, $T_0$-2 DENOTES SECOND FRAME $T_0$ TIME SLOT, AND $T_0$-3 DENOTES THIRD FRAME $T_0$ TIME SLOT.

NOTE 5 : *RX REPRESENTS CONTROL CHANNEL UP-LINK RECEPTION FUNCTION FROM MOBILE STATION ( ORDINARY RECEPTION FUNCTION).

FIG.16

|  |  | $T/R_0$-1 Down-Link | $T/R_0$-1 Up-Link | $T/R_0$-2 Down-Link | $T/R_0$-2 Up-Link | $T/R_0$-3 Down-Link |
|---|---|---|---|---|---|---|
| BS1 | TDMA CONTROL CHANNEL | TX | *RX | RX | *RX | TX |
| | TIME-DIVIDED CDMA CONTROL CHANNEL | TX | *RX | RX | *RX | TX |
| BS2 | TDMA CONTROL CHANNEL | RX | *RX | TX | *RX | RX |
| | TIME-DIVIDED CDMA CONTROL CHANNEL | RX | *RX | TX | *RX | RX |
| BS3 | TDMA CONTROL CHANNEL | TX | *RX | RX | *RX | TX |
| | TIME-DIVIDED CDMA CONTROL CHANNEL | TX | *RX | RX | *RX | TX |

NOTE 1 : $T/R_0$ DENOTES 0TH TRANSMISSION TIME SLOT OF FDD. IN THIS TIME SLOT, BASE STATION TRANSMITS CONTROL CHANNEL, BUT IN THE SCHEME ABOVE, TDMA AND TIME-DIVIDED CDMA ALTERNATELY PERFORM RECEPTION AND TRANSMISSION IN TIME SLOT $T/R_0$. HERE, RECEPTION REPRESENTS THE FUNCTION OF RECEIVING CONTROL CHANNEL OF ANY OTHER BASE STATION FOR FRAME SYNCHRONIZATION BETWEEN BASE STATIONS.

NOTE 2 : TABLE ABOVE REPRESENTS CASE WHEREIN BS2 RECEIVES CONTROL CHANNEL OF BS1 AND BS3 RECEIVES CONTROL CHANNEL OF BS2.

NOTE 3 : IN THE SCHEME ABOVE, WHEN BASE STATION BS RECEIVES TIME-DIVIDED CDMA CONTROL CHANNEL AND TDMA CONTROL CHANNEL, TIME-DIVIDED CDMA SPEECH CHANNEL AND TDMA SPEECH CHANNEL CANNOT BE TRANSMITTED IN THIS TIME SLOT. ACCORDINGLY, IN $T/R_0$ TIME SLOT, TIME-DIVIDED CDMA SPEECH CHANNEL AND TDMA SPEECH CHANNEL ARE ALLOCATED FOR HALF RATE USE IN WHICH TIME SLOT OF EVERY OTHER FRAME IS USED.

NOTE 4 : IN TABLE ABOVE, $T/R_0$-1 DENOTES FIRST FRAME $T/R_0$ TIME SLOT, $T/R_0$-2 DENOTES SECOND FRAME $T/R_0$ TIME SLOT, AND $T/R_0$-3 DENOTES THIRD FRAME $T/R_0$ TIME SLOT.

NOTE 5 : *RX REPRESENTS CONTROL CHANNEL UP-LINK RECEPTION FUNCTION FROM MOBILE STATION ( ORDINARY RECEPTION FUNCTION).

FIG.18

|  |  | $T_0$-1 | $R_0$-1 | $T_0$-2 | $R_0$-2 | $T_0$-3 |
|---|---|---|---|---|---|---|
| BS1 | TDMA CONTROL CHANNEL | TX | *RX | RX | *RX | TX |
|  | TIME-DIVIDED CDMA CONTROL CHANNEL | TX | *RX | RX | *RX | TX |
| BS2 | TDMA CONTROL CHANNEL | RX | *RX | TX | *RX | RX |
|  | TIME-DIVIDED CDMA CONTROL CHANNEL | RX | *RX | TX | *RX | RX |
| BS3 | TDMA CONTROL CHANNEL | RX | *RX | TX | *RX | RX |
|  | TIME-DIVIDED CDMA CONTROL CHANNEL | RX | *RX | TX | *RX | RX |

NOTE 1 : $T_0$ DENOTES 0TH TRANSMISSION TIME SLOT OF TDD. IN THIS TIME SLOT, BASE STATION TRANSMITS CONTROL CHANNEL, BUT IN THE SCHEME ABOVE, TDMA AND TIME-DIVIDED CDMA ALTERNATELY PERFORM RECEPTION AND TRANSMISSION IN TIME SLOT $T_0$. HERE, RECEPTION REPRESENTS THE FUNCTION OF RECEIVING CONTROL CHANNEL OF ANY OTHER BASE STATION FOR FRAME SYNCHRONIZATION BETWEEN BASE STATIONS.

NOTE 2 : TABLE ABOVE REPRESENTS CASE WHEREIN BS2 AND BS3 RECEIVE CONTROL CHANNELS OF BS1 AND BS3 AND BS2 ESTABLISH FRAME SYNCHRONIZATION SIMULTANEOUSLY.

NOTE 3 : IN THE SCHEME ABOVE, WHEN BASE STATION BS RECEIVES TIME-DIVIDED CDMA CONTROL CHANNEL AND TDMA CONTROL CHANNEL, TIME-DIVIDED CDMA SPEECH CHANNEL AND TDMA SPEECH CHANNEL CANNOT BE TRANSMITTED IN THIS TIME SLOT. ACCORDINGLY, IN $T_0$ TIME SLOT, TIME-DIVIDED CDMA SPEECH CHANNEL AND TDMA SPEECH CHANNEL ARE ALLOCATED FOR HALF RATE USE IN WHICH EVERY OTHER TIME SLOT IS USED.

NOTE 4 : IN TABLE ABOVE, $T_0$-1 DENOTES FIRST FRAME $T_0$ TIME SLOT, $T_0$-2 DENOTES SECOND FRAME $T_0$ TIME SLOT, AND $T_0$-3 DENOTES THIRD FRAME $T_0$ TIME SLOT.

NOTE 5 : *RX REPRESENTS CONTROL CHANNEL UP-LINK RECEPTION FUNCTION FROM MOBILE STATION ( ORDINARY RECEPTION FUNCTION).

FIG.20

|  |  | $T/R_0$-1 Down-Link | $T/R_0$-1 Up-Link | $T/R_0$-2 Down-Link | $T/R_0$-2 Up-Link | $T/R_0$-3 Down-Link |
|---|---|---|---|---|---|---|
| BS1 | TDMA CONTROL CHANNEL | TX | *RX | RX | *RX | TX |
|  | TIME-DIVIDED CDMA CONTROL CHANNEL | TX | *RX | RX | *RX | TX |
| BS2 | TDMA CONTROL CHANNEL | RX | *RX | TX | *RX | RX |
|  | TIME-DIVIDED CDMA CONTROL CHANNEL | RX | *RX | TX | *RX | RX |
| BS3 | TDMA CONTROL CHANNEL | RX | *RX | TX | *RX | RX |
|  | TIME-DIVIDED CDMA CONTROL CHANNEL | RX | *RX | TX | *RX | RX |

NOTE 1 : $T/R_0$ DENOTES 0TH TRANSMISSION TIME SLOT OF FDD. IN THIS TIME SLOT, BASE STATION TRANSMITS CONTROL CHANNEL, BUT IN THE SCHEME ABOVE, TDMA AND TIME-DIVIDED CDMA ALTERNATELY PERFORM RECEPTION AND TRANSMISSION IN TIME SLOT $T/R_0$. HERE, RECEPTION REPRESENTS THE FUNCTION OF RECEIVING CONTROL CHANNEL OF ANY OTHER BASE STATION FOR FRAME SYNCHRONIZATION BETWEEN BASE STATIONS.

NOTE 2 : TABLE ABOVE REPRESENTS CASE WHEREIN BS2 AND BS3 RECEIVE CONTROL CHANNELS OF BS1 AND BS1 RECEIVES CONTROL CHANNELS OF BS2 AND BS3 SIMULTANEOUSLY.

NOTE 3 : IN THE SCHEME ABOVE, WHEN BASE STATION BS RECEIVES TIME-DIVIDED CDMA CONTROL CHANNEL AND TDMA CONTROL CHANNEL, TIME-DIVIDED CDMA SPEECH CHANNEL AND TDMA SPEECH CHANNEL CANNOT BE TRANSMITTED IN THIS TIME SLOT. ACCORDINGLY, IN $T/R_0$ TIME SLOT, TIME-DIVIDED CDMA SPEECH CHANNEL AND TDMA SPEECH CHANNEL ARE ALLOCATED FOR HALF RATE USE IN WHICH TIME SLOT OF EVERY OTHER FRAME IS USED.

NOTE 4 : IN TABLE ABOVE, $T/R_0$-1 DENOTES FIRST FRAME $T/R_0$ TIME SLOT, $T/R_0$-2 DENOTES SECOND FRAME $T/R_0$ TIME SLOT, AND $T/R_0$-3 DENOTES THIRD FRAME $T/R_0$ TIME SLOT.

NOTE 5 : *RX REPRESENTS CONTROL CHANNEL UP-LINK RECEPTION FUNCTION FROM MOBILE STATION ( ORDINARY RECEPTION FUNCTION).

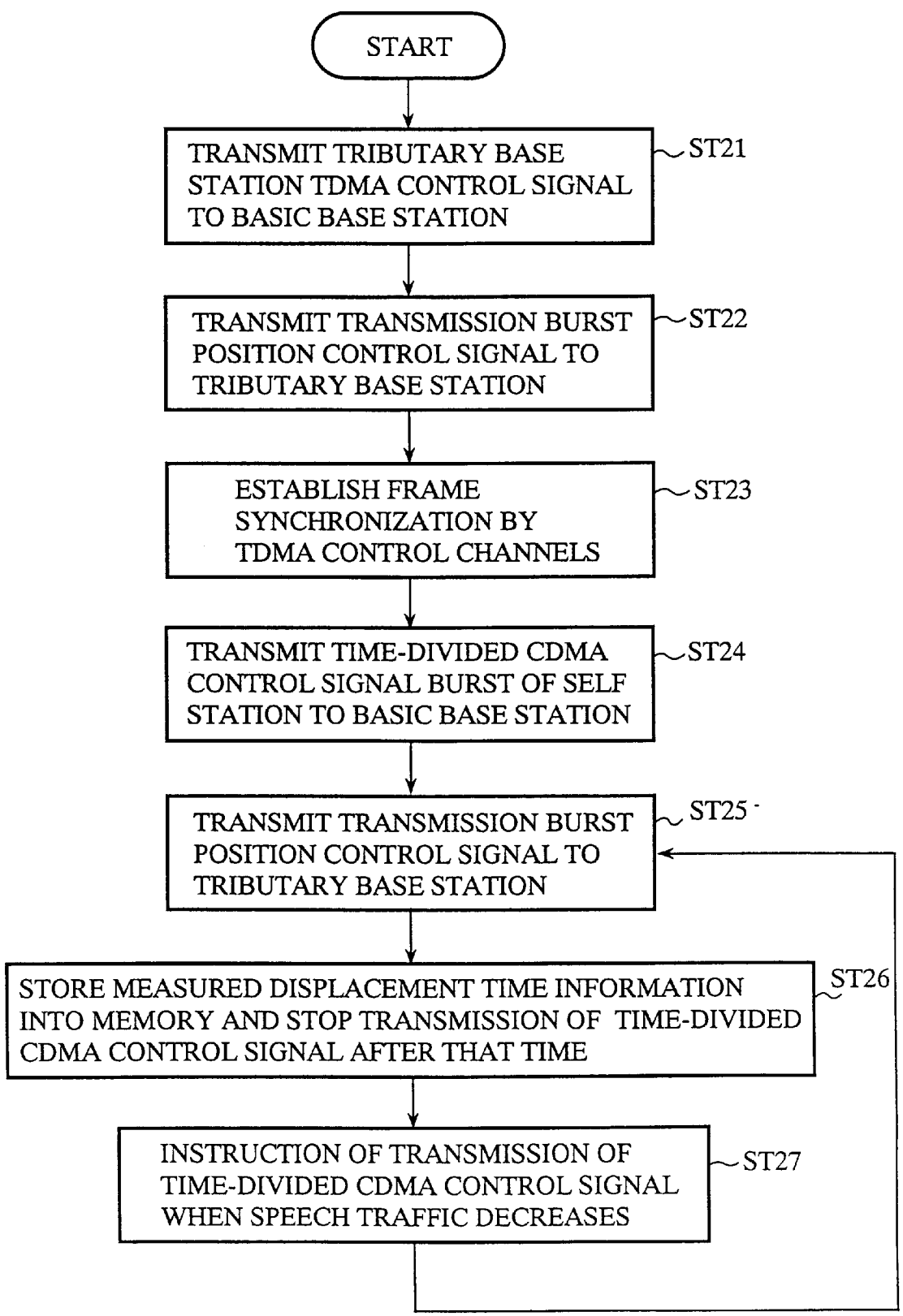

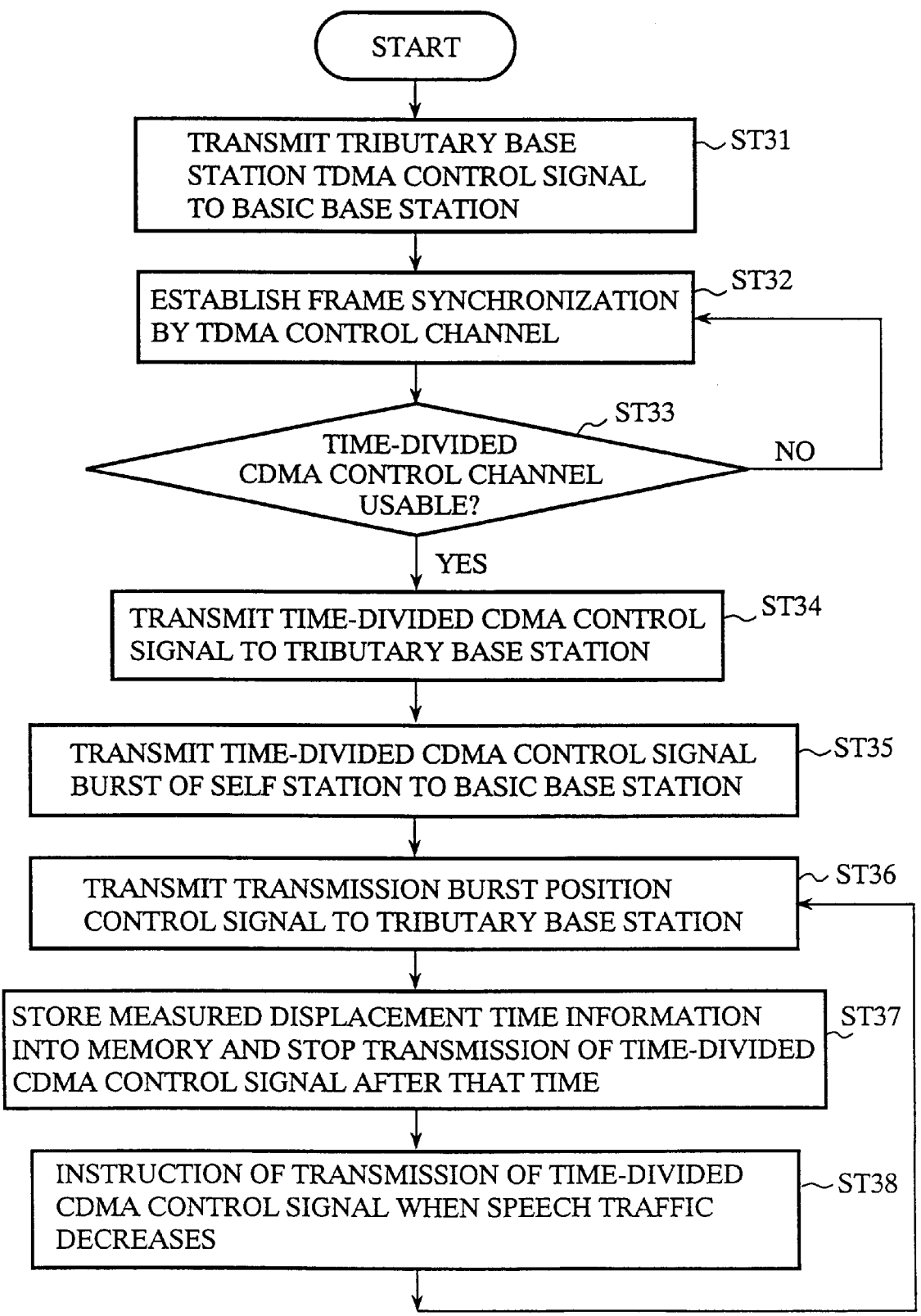

FIG.23

|  |  | $T_0$-1 | $R_0$-1 | $T_0$-2 | $R_0$-2 | $T_0$-3 |
|---|---|---|---|---|---|---|
| BS1 | TDMA CONTROL CHANNEL | TX | *RX | RX | *RX | TX |
|  | TIME-DIVIDED CDMA CONTROL CHANNEL | #TX | *RX | TX | *RX | #TX |
| BS2 | TDMA CONTROL CHANNEL | RX | *RX | TX | *RX | RX |
|  | TIME-DIVIDED CDMA CONTROL CHANNEL | TX | *RX | #TX | *RX | TX |
| BS3 | TDMA CONTROL CHANNEL | RX | *RX | TX | *RX | RX |
|  | TIME-DIVIDED CDMA CONTROL CHANNEL | TX | *RX | #TX | *RX | TX |

NOTE 1 : $T_0$ DENOTES 0TH TRANSMISSION TIME SLOT OF TDD. IN THIS TIME SLOT, BASE STATION TRANSMITS CONTROL CHANNEL, BUT IN THE SCHEME ABOVE, TDMA AND TIME-DIVIDED CDMA ALTERNATELY PERFORM RECEPTION AND TRANSMISSION IN TIME SLOT $T_0$. HERE, RECEPTION REPRESENTS THE FUNCTION OF RECEIVING CONTROL CHANNEL OF ANY OTHER BASE STATION FOR FRAME SYNCHRONIZATION BETWEEN BASE STATIONS.

NOTE 2 : TABLE ABOVE REPRESENTS CASE WHEREIN BS2 AND BS3 RECEIVE CONTROL CHANNELS OF BS1 AND BS3 AND BS2 ESTABLISH FRAME SYNCHRONIZATION SIMULTANEOUSLY.

NOTE 3 : IN THE SCHEME ABOVE, WHEN BASE STATION BS RECEIVES TIME-DIVIDED CDMA CONTROL CHANNEL, TIME-DIVIDED CDMA SPEECH CHANNEL CANNOT BE TRANSMITTED IN THIS TIME SLOT. ACCORDINGLY, IN $T_0$ TIME SLOT, TIME-DIVIDED CDMA SPEECH CHANNEL IS ALLOCATED FOR HALF RATE USE IN WHICH EVERY OTHER TIME SLOT IS USED.

NOTE 4 : IN TABLE ABOVE, $T_0$-1 DENOTES FIRST FRAME $T_0$ TIME SLOT, $T_0$-2 DENOTES SECOND FRAME $T_0$ TIME SLOT, AND $T_0$-3 DENOTES THIRD FRAME $T_0$ TIME SLOT.

NOTE 5 : *RX REPRESENTS CONTROL CHANNEL UP-LINK RECEPTION FUNCTION FROM MOBILE STATION ( ORDINARY RECEPTION FUNCTION).

NOTE 6 : #TX IS AN EXAMPLE OF A SPEECH CHANNEL WITHOUT PERFORMING CONTROL CHANNEL RECEPTION. AFTER THE SPEECH TRAFFIC LOAD DECREASES AND CONDITION WHEREIN THIS TIME SLOT CAN BE USED AS A TIME-DIVIDED CDMA CONTROL CHANNEL IS ENTERED, SYNCHRONIZATION BETWEEN BASE STATIONS IS RE-ESTABLISHED AT TIME-DIVIDED CDMA CHIP RATE.

FIG.24

|  | | $T/R_0$-1 Down-Link | $T/R_0$-1 Up-Link | $T/R_0$-2 Down-Link | $T/R_0$-2 Up-Link | $T/R_0$-3 Down-Link |
|---|---|---|---|---|---|---|
| BS1 | TDMA CONTROL CHANNEL | TX | *RX | RX | *RX | TX |
| | TIME-DIVIDED CDMA CONTROL CHANNEL | #TX | *RX | TX | *RX | #TX |
| BS2 | TDMA CONTROL CHANNEL | RX | *RX | TX | *RX | RX |
| | TIME-DIVIDED CDMA CONTROL CHANNEL | TX | *RX | #TX | *RX | TX |
| BS3 | TDMA CONTROL CHANNEL | RX | *RX | TX | *RX | RX |
| | TIME-DIVIDED CDMA CONTROL CHANNEL | TX | *RX | #TX | *RX | TX |

NOTE 1 : $T/R_0$ DENOTES 0TH TRANSMISSION TIME SLOT OF FDD. IN THIS TIME SLOT, BASE STATION TRANSMITS CONTROL CHANNEL, BUT IN THE SCHEME ABOVE, TDMA AND TIME-DIVIDED CDMA ALTERNATELY PERFORM RECEPTION AND TRANSMISSION IN TIME SLOT $T/R_0$. HERE, RECEPTION REPRESENTS THE FUNCTION OF RECEIVING CONTROL CHANNEL OF ANY OTHER BASE STATION FOR FRAME SYNCHRONIZATION BETWEEN BASE STATIONS.

NOTE 2 : TABLE ABOVE REPRESENTS CASE WHEREIN BS2 AND BS3 RECEIVE CONTROL CHANNELS OF BS1 AND BS1 RECEIVES CONTROL CHANNELS OF BS2 AND BS3 SIMULTANEOUSLY.

NOTE 3 : IN THE SCHEME ABOVE, WHEN BASE STATION BS RECEIVES TIME-DIVIDED CDMA CONTROL CHANNEL, TIME-DIVIDED CDMA SPEECH CHANNEL CANNOT BE TRANSMITTED IN THIS TIME SLOT. ACCORDINGLY, IN $T/R_0$ TIME SLOT, TIME-DIVIDED CDMA SPEECH CHANNEL IS ALLOCATED FOR HALF RATE USE IN WHICH TIME SLOT OF EVERY OTHER FRAME IS USED.

NOTE 4 : IN TABLE ABOVE, $T/R_0$-1 DENOTES FIRST FRAME $T/R_0$ TIME SLOT,$T/R_0$-2 DENOTES SECOND FRAME $T/R_0$ TIME SLOT, AND $T/R_0$-3 DENOTES THIRD FRAME $T/R_0$ TIME SLOT.

NOTE 5 : *RX REPRESENTS CONTROL CHANNEL UP-LINK RECEPTION FUNCTION FROM MOBILE STATION ( ORDINARY RECEPTION FUNCTION).

NOTE 6 : #TX IS AN EXAMPLE OF A TIME-DIVIDED CDMA SPEECH CHANNEL WITHOUT PERFORMING TIME-DIVIDED CDMA CONTROL CHANNEL RECEPTION. AFTER SPEECH TRAFFIC DECREASES AND CONDITION WHEREIN THIS TIME SLOT CAN BE USED AS A TIME-DIVIDED CDMA CONTROL CHANNEL IS ENTERED, FRAME SYNCHRONIZAIOTN BETWEEN BASE STATIONS IS RE-ESTABLISHED IN UNITS OF TIME-DIVIDED CDMA CHIP RATE.

MOBILE COMMUNICATION SYSTEM

TECHNICAL FIELD

This invention relates to a mobile communication system which realizes frequency channel sharing or time slot sharing using a time division multiple access (hereinafter referred to as TDMA) system or a time-divided code division multiple access (hereinafter referred to as time-divided CDMA) system, and more particularly to measurement and utilization of the distance between a radio base station and a mobile station or between radio base stations, and acquisition and keeping of frame synchronization between a radio base station and a mobile station or between radio base stations.

BACKGROUND ART

A mobile communication system is formed principally from, for example, mobile vehicle-carried communication apparatus, mobile portable communication apparatus or like apparatus (hereinafter referred to as mobile stations) and radio base stations which communicate with the mobile stations by radio channels. In such a mobile communication system, sharing of a same radio frequency spectrum by different radio systems (such sharing is hereinafter referred to as frequency channel sharing) is sometimes performed between a frequency division multiple access (hereinafter referred to as FDMA) or a TDMA system and a CDMA system. In the CDMA system, frequency channel sharing between different codes have already been put into practical use.

Here, a mobile communication system of the time slot sharing type where a TDMA signal and a time-divided CDMA signal are shared in the same time slot is disclosed in U.S. patent application No. 08/524,974, now U.S. Pat. No. 5,805,581 incorporated by reference herein. However, in this patent application, measurement of the distance between a mobile station and a radio base station is not mentioned, and no description of synchronization between radio base stations is given either.

Meanwhile, also a technique regarding a mobile communication system of the time slot sharing type and simultaneously of the frequency channel sharing type and another technique regarding synchronization between radio base stations which employs a semi-fixed communication apparatus (hereinafter referred to as WLL station) which employs a wireless local loop (hereinafter referred to as WLL) or a like apparatus are present already. However, those techniques don't involve measurement of the distance between a mobile station and a radio base station or synchronization between radio base stations by a chip rate unit.

A mobile communication system in which a plurality of CDMA signals are shared is known by U.S. Pat. No. 5,363,403. However, the specification of U.S. Pat. No. 5,363,403 describes nothing of a method of handling a time-divided CDMA signal. Another mobile communication system is known by U.S. Pat. No. 5,511,068. However, U.S. Pat. No. 5,511,068 relates to an adaptive filter for a time-divided CDMA signal system, and the specification of U.S. Pat. No. 5,511,068 does not describe that frequency channel sharing of a CDMA signal and a TDMA signal is performed in one time slot.

Meanwhile, a mobile communication system disclosed in International Publication WO96/18277 relates to a macro diversity technique, and also an exchange is a simple one which merely compares service qualities of information received simultaneously from a plurality of radio base stations to select a best one of them, but the results are not utilized for hand-over or the like. Further, the specification of International Publication WO96/18277 describes nothing of a combination with a time-divided CDMA technique.

Further, a mobile communication system which measures the distance between a mobile station and a radio base station using a chip code is disclosed by U.S. Pat. No. 5,506,864 and U.S. Pat. No. 5,365,544. However, the U.S. patents relate to a mobile communication system of the continuous CDMA system, and while the specifications of them describe that the mobile communication system is characterized in that it uses a generic chip code in addition to a spread-spectrum chip code, they do not relate to a mobile communication system which is based on the time-divided CDMA system and do not mention that the distance between a mobile station and a radio base station is measured making use of a frame structure or a characteristic of the time-divided CDMA system.

Meanwhile, frame synchronization between radio base stations in a mobile communication system is known by U.S. Pat. No. 5,440,561. However, the specification of the U.S. patent merely describes a TDMA system but does not describe a time-divided CDMA system. Also in regard to arrangement of radio base stations, it is presumed that a radio base station is located at the center of a hexagonal cell, but no investigation is made for such a case that the distances between radio base stations are not equal to each other.

It is to be noted that, as other documents which relate to frame synchronization between radio base stations of a mobile communication system, Japanese Patent Laid-Open Application No. 8-23569 and Japanese Patent Laid-Open Application No. 8-33037 as well as Japanese Patent Laid-Open Application No. Hei 7-46660 are known.

Each of Japanese Patent Laid-Open Application No. 8-23569 and Japanese Patent Laid-Open Application No. 8-33037 mentioned above describes, in the description of [claims] in the specification thereof, that "so that the difference in timing may be equal to n times the one burst length of TDMA/TDD". This is a characteristic of the TDMA system which employs satellite communication, and has no relation to a mobile communication on the ground. In particular, in a mobile communication system on the ground, since the distance between a mobile station and a radio base station does not become so long as the distance between a communications satellite and the earth, such a situation as described above does not occur, and also such a condition that a radio base station transmits in a certain frame from among multiple frames whereas a tributary radio base station transmits in another frame does not occur. Furthermore, the specifications mentioned above describe nothing of frame synchronization by a chip plate unit of the time-divided CDMA system.

Meanwhile, Japanese Patent Laid-Open Application No. Hei 7-46660 discloses that information representing to which one of time slots in a TDMA frame a TDMA control signal is transmitted is included in control information. Indeed where the frame length is long or in a system which requires provision of several control information time slots, such a prescription is required. However, where a mobile communication system which presupposes that a control signal is transmitted and received using a first time slot in a frame is considered, information indicating this explicitly need not be included in a control signal. Furthermore, a mobile communication system which can set a plurality of TDMA control channels and a plurality of time-divided CDMA control channels in a first time slot need not use the technique disclosed in Japanese Patent Laid-Open Application No. Hei 7-46660 mentioned above.

In this manner, as a mobile communication system which includes a plurality of mobile stations and one or more radio base stations which communicate with the radio stations by radio channels, such various systems as described above are conventionally known already. In such radio communication systems, where both of the TDMA system and the time-divided CDMA system are used, it becomes necessary to establish frame synchronization on the time axis between different radio base stations.

It is to be noted that, while such establishment of frame synchronization between radio base stations can be performed using a time indication signal of the global positioning system (hereinafter referred to as GPSP), to this end, it is required that all radio base stations be equipped with a GPS reception system and besides those radio base stations are installed at locations at which a GPS signal can be received.

However, in a personal communication system (hereinafter referred to as PCS) and so forth, a radio base station is sometimes installed indoors or in underground facilities. In order to utilize a GPS signal also in such a case, a complicated apparatus is required. The conventional mobile communication systems have such problems as described above.

The present invention has been made to solve such problems as described above, and it is an object of the present invention to provide a mobile communication system that a control channel is allocated to a TDMA signal or a time-divided CDMA signal to establish frame synchronization between a plurality of radio base stations such as a plurality of operators (such a communication user which owns a system which supplies a mobile communication service is normally called an operator) and the distance between a mobile station and a radio base station is measured accurately so that discrimination of hand-over can be performed.

DISCLOSURE OF INVENTION

A mobile communication system according to a first aspect of the invention is constructed such that a time difference, eliminated by a fixed time difference, between a top time position of a burst received from a radio base station and a top time position of a burst transmitted so that the burst may arrive at the radio base station at the top of a time slot, and information of the measured time difference is notified to the radio base station. By the construction, a mobile communication system which can measure the distance between a radio base station and a mobile station accurately can be realized.

A mobile communication system according to a second aspect of the invention is constructed such that, using a mobile communication system of the TDMA/time-divided CDMA sharing system in which a time slot of the time-divided CDMA system is inserted in time slots of a frame construction of a TDMA system, each of the mobile stations measures a time difference, eliminated by a fixed time difference, between a received burst from the radio base station and a top time position of a transmitted burst transmitted so that the burst may arrive at the radio base station at the top of a time slot, and transmits information of the measured time difference to the radio base station.

A mobile communication system according to a third aspect of the invention is constructed such that the time difference, eliminated by the fixed time difference, between the top time position of the received burst signal from the radio base station and the top time position of the transmitted burst signal to the radio base station is measured in a chip rate unit which is used in time-divided CDMA communication.

A mobile communication system according to a fourth aspect of the invention is constructed such that a time difference, eliminated by a fixed time difference, between a top time position of a burst received from any other radio base station than the radio base station with which the mobile station is communicating and the top time position of the burst transmitted to the radio base station is measured, and information of the measured time difference is transmitted to the radio base station with which the mobile station is communicating.

A mobile communication system according to a fifth aspect of the invention is constructed such that each of the mobile stations includes a correlation reception/despread-spectrum coding calculation section for extracting an original signal from a spread-spectrum coded signal sent thereto from the radio base station, a CH reception/TDMA demodulation section for demodulating a despread-spectrum coded time-divided CDMA signal and extracting a necessary signal, a digital-to-analog conversion section for decoding an information signal from the extracted signal into an analog signal and forwarding the analog signal to a man-machine interface section, an analog-to-digital conversion section for coding an information signal from the man-machine interface section into a digital code signal a CH transmission/TDMA multiplexing section for multiplexing the coded signal, a spread-spectrum coding calculation section for spectrum-spreading the multiplexed information on a frequency axis, a burst control/intra-frame time setting and time measurement section for controlling and adjusting an emission time of a burst signal in response to an instruction of the radio base station and measuring the time difference, subtracted by the fixed time difference, between the top time position of the burst signal received from the radio base station and the top time position of the burst signal transmitted to the radio base station, and a spread-spectrum code generator-chip rate generator for generating a chip rate and a spread-spectrum code allocated to the self station.

A mobile communication system according to a sixth aspect of the invention is constructed such that the radio base station includes a plurality of signal processing sections each including a correlation reception/despread-spectrum coding calculation section, a CH reception/TDMA demodulation section, a conversion section for outputting an information signal to a network man-machine interface section, another conversion section for inputting an information signal from the network man-machine interface section, a CH transmission/TDMA multiplexing section, a spread-spectrum coding calculation section, a burst control/intra-frame time setting and time measurement section, and a spread-spectrum code generator-/chip rate generator, and a signal distribution and addition section for performing distribution and addition of signals inputted to and outputted from the signal processing sections.

A mobile communication system according to a seventh aspect of the invention is constructed such that, in at least one of the signal processing sections of the radio base station, the conversion section for decoding the information signal is constructed as a digital-to-analog conversion section which decodes a signal extracted by the CH reception/TDMA demodulation section into an analog information signal and outputs the analog information signal to an analog network interface section, and the conversion section for coding an information signal is constructed as an analog-to-digital conversion section which codes an information signal inputted from the analog network interface section into a digital code signal.

A mobile communication system according to an eighth aspect of the invention is constructed such that the CH reception/TDMA demodulation section of each of the mobile stations includes a demultiplexing section for separating an information signal and control information included in a time slot destined for the self station, and an information signal memory and a control information memory for temporarily storing the information signal and the control information, that the CH transmission/TDMA multiplexing section of each of the mobile stations includes an information signal memory and a control information memory for temporarily storing an information signal and control information to be transmitted, and a multiplexing section for composing the information signal and the control information and multiplexing the composed signal in a time slot allocated to the self station, and that the mobile station includes a control information processor for decoding the control information from the radio base station, instructing the mobile station of various functions based on the decoded control information and transmitting a response to the control information to the radio base station.

A mobile communication system according to a ninth aspect of the invention is constructed such that, in a first process, necessary control information is first communicated with a radio base station using a designated TDMA control channel, and thereafter, if a time-divided CDMA speech channel is designated, then in a third process, a service is performed using the time-divided CDMA speech channel, but if a TDMA communication channel is designated, then a service is performed using the TDMA communication channel in a second process. By this construction, when a mobile station first participates in this system, regarding frame information from the radio base station, it is possible to first use a TDMA control channel to establish frame synchronization at a TDMA symbol rate, with which it is easy to establish synchronization rough in time and then establish synchronization at a chip rate of the time-divided CDMA which is higher in accuracy in time.

A mobile communication system according to a tenth aspect of the invention is constructed such that, in the first process, the mobile station measures a time difference, eliminated by a fixed time, between a top time position of a TDMA control signal burst transmitted from the radio base station and a top time position of a TDMA control signal burst transmitted to the radio base station and transmits the time difference information to the radio base station. By this construction, in the first process, the distance between the mobile station and the radio base station can be measured only from a signal burst of the TDMA without using the time-divided CDMA by measuring the time difference of the fixed time difference from the time difference of the top time position of the transmission burst with a number of information symbols.

A mobile communication system according to an eleventh aspect of the invention is constructed such that, in the second process, the mobile station measures a time difference, eliminated by a fixed time difference from a time difference, between a top time position of a TDMA speech signal burst transmitted from the radio base station and a top time position of a TDMA speech signal burst transmitted to the radio base station in a time-divided CDMA chip rate unit and transmits the time difference information to the radio base station. By this construction, although the speech channel is the TDMA, time measurement can be performed in a chip rate unit of the time-divided CDMA. In particular, a chip rate is usually by approximately several ten times to several hundred times faster than a symbol rate of the TDMA, and accordingly, if measurement is performed with the chip rate of the higher speed, then the accuracy in time difference can be increased by a degree corresponding to the multiple.

A mobile communication system according to a twelfth aspect of the invention is constructed such that, in the third process, the mobile station measures a time difference, eliminated by a fixed time difference from a time difference, between a top time position of a time-divided CDMA speech signal burst transmitted from the radio base station and a top time position of a time-divided CDMA speech signal burst transmitted to the radio base station and transmits the time difference information to the radio base station. By this construction, the communication channel is the time-divided CDMA, and also time difference measurement is performed at a high speed at a chip rate of the time-divided CDMA A mobile communication system according to a thirteenth aspect of the invention is constructed such that each of mobile stations measures a time difference, eliminated by a fixed time difference from a time difference, between top time positions of bursts transmitted to and received from a radio base station in a chip rate unit and transmits a resulting value to the radio base station, and a mobile switching center calculates distances between radio base stations and mobile stations based on time difference information collected from the radio base stations and stores the distance information. By determining hand-over based on the distance information, the emission of unnecessarily strong radio waves from both of a mobile station and a radio base station can be prevented.

A mobile communication system according to a fourteenth aspect of the invention is constructed such that the mobile switching center supervises distances between each of the mobile stations and a plurality of radio base stations around the mobile station and forwards a hand-over starting instruction so as to newly set a radio channel to the one radio base station if the distance to the mobile station is shorter from any other one of the radio base stations than from that radio base station to which the mobile station is connected,.

A mobile communication system according to a fifteenth aspect of the invention is constructed such that, if the nearest radio base station is a radio base station of a different operator, the mobile switching center transmits a hand-over starting instruction to the radio base station via a public system and a mobile switching center of the different operator. Consequently, hand-over can be performed also between radio base stations owned by different operators.

A mobile communication system according to a sixteenth aspect of the invention is constructed such that a tributary base station measures a time difference, eliminated by a fixed time difference, between a top time position between burst signals received from a radio base station and a top time position of a burst transmitted so that the burst may arrive at the radio base position at the top of a time slot, and transmits the measurement information to the radio base station. By this construction, a mobile radio system which can measure the distance between a radio base station and a tributary base station accurately can be realized.

A mobile communication system according to a seventeenth aspect of the invention is constructed such that as the mobile communication system, using a mobile communication system of the TDMA/time-divided CDMA sharing system that a time slot of the time-divided CDMA system is inserted in time slots of a frame construction of a TDMA system is used, a tributary base station measures a time difference, eliminated by a fixed time difference from a time difference, between a top time position between burst signals received from a radio base station and a top time position of a burst transmitted so that the burst may arrive at the radio base position at a top time position of a time slot, and transmits the measurement information to the radio base station. By this construction, in a TDD mobile communication system of the TDMA system and the time-divided CDMA system, frame synchronization between radio base stations is established, and interference between time slots can be eliminated.

A mobile communication system according to an eighteenth aspect of the invention is constructed such that a time difference, eliminated by the fixed time difference, between a top time position of a burst signal received from the radio base station and a top time position of a burst signal transmitted to the radio base station is measured in a chip rate unit which is used in time-divided CDMA communication.

A mobile communication system according to a nineteenth aspect of the invention is constructed such that it is discriminated whether or not a time-divided CDMA control information reception burst from the tributary base station is at an appropriate burst position, and when the received burst is at an appropriate burst position, the discrimination information is transmitted to the radio base station, and then the information of the time difference eliminated by the fixed time difference is transmitted to the radio base station.

A mobile communication system according to a twentieth aspect of the invention is constructed such that, when the received burst signal from the tributary base station is displaced from the appropriate burst position, the displacement information measured in a chip rate unit of the time-divided CDMA system is transmitted to the tributary base station via a control channel, and the tributary base station receiving the displacement information corrects a top time position of a burst signal to be transmitted to the radio base station in time based on the information of the displacement. By repeating this process, frame synchronization between the radio base stations can be established.

A mobile communication system according to a twenty first aspect of the invention is constructed such that, when the tributary base station detects a top time position of a received burst signal, the tributary base station stops transmission of a burst signal of a time slot which should originally be transmitted from the tributary base station, and receives a time-divided CDMA control signal burst transmitted from the radio base station.

A mobile communication system according to a twenty second aspect of the invention is constructed such that a radio base station discriminates that a received burst is at an appropriate burst position and transmits the discrimination information to a tributary base station and the tributary base station receiving the discrimination information transmits information of a time difference between top time positions of transmitted and received burst signals so as to form a TDD mobile communication system, and the radio base station transmits a TDMA control signal burst and a time-divided CDMA control signal burst in a top slot of every other frame.

A mobile communication system according to a twenty third aspect of the invention is constructed such that, in a time slot in which a TDMA control signal burst and a time-divided CDMA control signal burst are not transmitted in a top slot thereof, the radio base station receives a TDMA control signal burst and a time-divided CDMA control signal burst from the tributary base station.

A mobile communication system according to a twenty fourth aspect of the invention is constructed such that, in a time slot in which the basic base station receives a TDMA control signal burst and a time-divided CDMA control signal burst transmitted from the tributary base station, although the time slot originally belongs to a down-link of the radio base station, the transmission is stopped and the TDMA control signal burst and the time-divided CDMA control signal burst from the tributary base station are received.

A mobile communication system according to a twenty fifth aspect of the invention is constructed such that the radio base station transmits, when synchronization information is to be propagated from the radio base station to a plurality of tributary base stations, a TDMA control signal burst and a time-divided CDMA control signal burst, and each of the tributary base stations transmits, when synchronization information is to be propagated from the tributary base station to the radio base station, a TDMA control signal burst or a time-divided CDMA control signal burst. By this construction, frame synchronization in the accuracy in a chip rate unit of the time-divided CDMA can be established between one radio base station and a plurality of tributary base stations at a time.

A mobile communication system according to a twenty sixth aspect of the invention is constructed such that frame synchronization between radio base stations is established first using a TDMA control channel and then using a time-divided CDMA control channel, and a displacement time between top time positions of burst signals transmitted and received by a tributary base station is stored into a memory. By this construction, even in a situation that updating of control information cannot be performed in cooperation with a radio base station, interference between time slots can be easily prevented readily if a top time position of a time-divided CDMA control signal received and the stored information of the displacement time are utilized.

A mobile communication system according to a twenty seventh aspect of the invention is constructed such that, after frame synchronization between the radio base stations by time-divided CDMA control channels is established, the radio base station uses a time slot, in which the radio base station has received the time-divided CDMA control signal from the tributary base station, as a speech channel to down-links to a plurality of mobile stations. By this construction, time slots can be utilized effectively.

A mobile communication system according to a twenty eighth aspect of the invention is constructed such that, when the traffic decreases, a time slot which has been used as a speech channel for a down-link to a plurality of mobile stations is used for reception of a time-divided CDMA control signal burst from the tributary base station to resume frame synchronization establishment between the radio base stations.

A mobile communication system according to a twenty ninth aspect of the invention is constructed such that, upon establishment of frame synchronization between radio base stations, after frame synchronization by a TDMA control channel is established, it is discriminated whether or not use of a time-divided CDMA control channel is allowed, and if use of a time-divided CDMA control channel is not allowed, then frame synchronization by the TDMA control channel is repeated, but if use of the time-divided CDMA control channel is allowed, then frame synchronization by the time-divided CDMA control channel is performed. By this construction, even in a situation that a time slot of the time-divided CDMA cannot be used for communication of control signals between radio base stations, at least the system can be operated by establishing frame synchronization between the radio base stations using the TDMA control channel.

BRIEF DESCRIPTION OF DRAWINGS

FIG. 11 is a diagrammatic view illustrating distance information between mobile stations and radio base stations around them stored in a memory of a system setting processor in the embodiment 3;

FIG. 12 is a flow chart illustrating a control process of distance measurement between a mobile station and a radio base station and hand-over starting in the embodiment 3;

FIG. 14 is a diagrammatic view illustrating allocation of transmission/reception of time slots shown in FIG. 13;

FIG. 16 is a diagrammatic view illustrating allocation of transmission/reception of time slots shown in FIG. 15;

FIG. 18 is a diagrammatic view illustrating allocation of transmission/reception of time slots shown in FIG. 17;

FIG. 20 is a diagrammatic view illustrating allocation of transmission/reception of time slots shown in FIG. 19;

FIG. 21 is a flow chart illustrating a process of frame synchronizing control between a radio base station and an adjacent tributary base station according to an embodiment 7 of the present invention;

FIG. 22 is a flow chart illustrating a process of frame synchronization control between a radio base station and an adjacent tributary base station according to an embodiment 8 of the present invention; and FIGS. 23 and 24 are diagrammatic views illustrating allocation of transmission/reception of time slots in the embodiment 8.

PREFERRED EMBODIMENTS OF THE INVENTION

In the following, in order to describe the present invention more in detail, best forms for carrying out the present invention are described with reference to the accompanying drawings.

Embodiment 1

Figure 1:
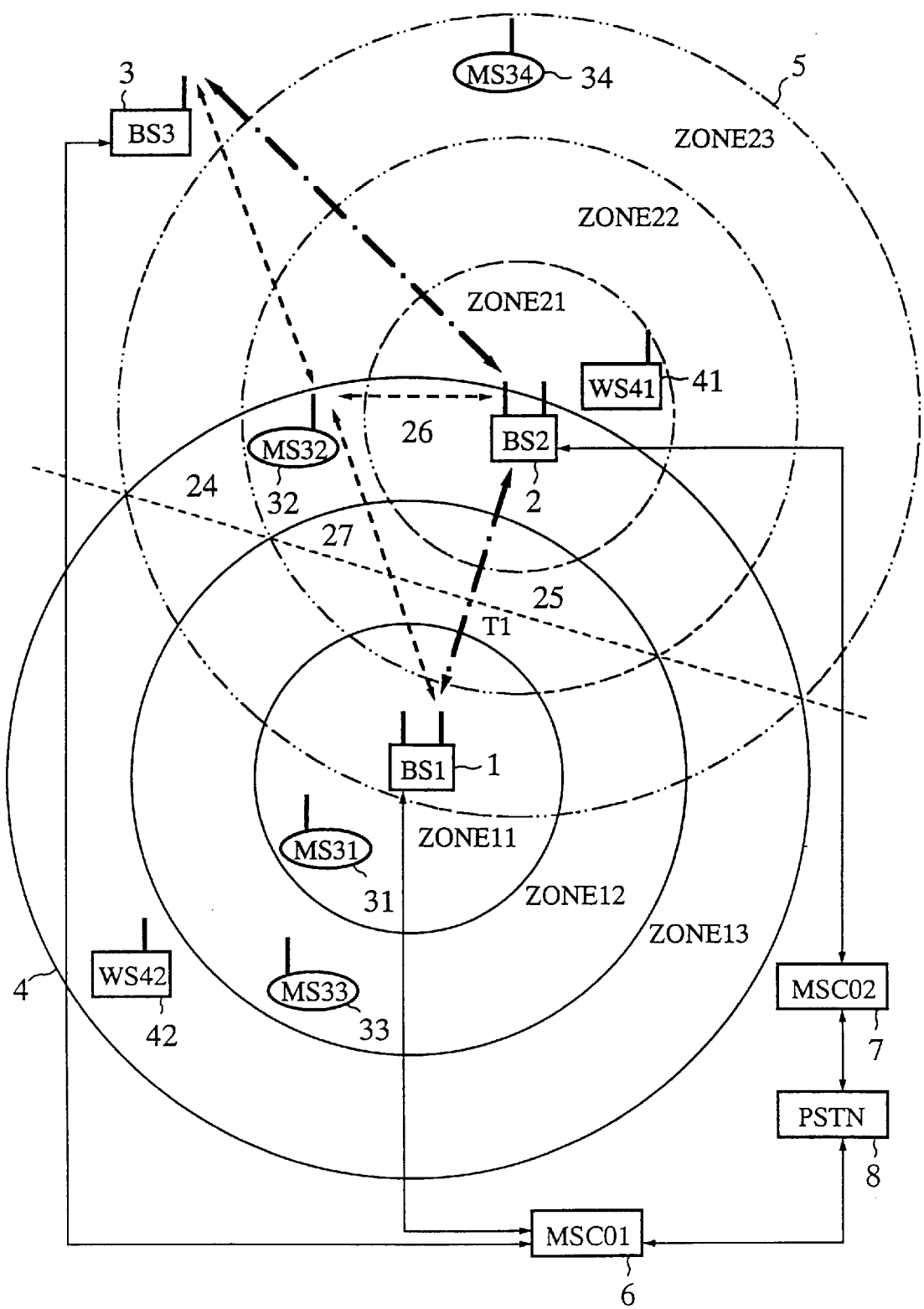
FIG. 1 is a system constructive view showing a general construction of a mobile communication system according to an embodiment 1 of the present invention.

FIG. 1 is a system constructive view showing a general construction of a mobile communication system to which a time slot sharing and frequency channel sharing system according to the present invention is applied. Referring to FIG. 1, reference numerals 1, 2 and 3 denote each a radio base station, and 4 and 5 denote each a radio cover area (hereinafter referred to as cell) constructed by the radio base station 1 or 2. It is to be noted that the cell 4 includes zones 11, 12 and 13, and the cell 5 includes zones 21, 22 and 23. Reference numerals 31, 32, 33 and 34 denote each a mobile station (MS) such as a mobile vehicle carried communication apparatus, a mobile portable communication apparatus or the like which communicates with the radio base station 1 or 2 over a radio channel. Reference numerals 41 and 42 denote each a WLL station (WS) which communicates with the radio base station 1 or 2 over a radio channel.

Reference numeral 6 denotes a mobile switching center (MSC) which controls the radio base stations 1 and 3, and 7 denotes a mobile switching center which controls the radio base station 2. Reference numeral 8 denotes a public switching telephone network (PSTN) to which the mobile switching centers 6 and 7 are connected by wires.

The present embodiment 1 relates to a mobile station-radio base station distance measuring system for a TDMA/time-divided CDMA system and an apparatus therefor, and in the following, measurement of the distance between a mobile station and a radio base station is described.

It is to be noted that, in the mobile communication system according to the present invention, the mobile stations 31 to 34 and WLL stations 41 and 42 are communicated with the radio base stations 1, 2 and 3 such that accessing is performed based on a multi-carriers time division multiple access (Multi-carriers TDMA) system and a time-divided CDMA system using a modulation signal according to a digital modulation system such as frequency shift keying (FSK), phase shift keying (PSK) such as BPSK, QPSK, DQPSK or π-DQPSK or minimum phase shift keying (MSK) such as QAMSK or QGMSK, and they are radio connected to each other by TDMA/frequency division duplex (hereinafter referred to as FDD), TMDA/time division duplex (hereinafter referred to as TDD) or by duplex according to time-divided CDMA/FDD or time-divided CDMA/TDD.

Further, the mobile communication system is a time slot sharing and frequency channel sharing mobile communication system which has a time-divided CDMA signal channel (hereinafter referred to as sharing channel) which shares a time slot and shares a frequency channel with an FDMA/TDD digital signal and a TDMA digital signal on the frequency axis, and a frequency channel sharing and time slot sharing WLL and mobile communication system that a TDMA signal in a same time slot of a same frequency channel is formed from a plurality of signals and the TDMA signals are synchronization word sharing, time slot sharing and frequency channel sharing TDMA signal which can be identified as they have synchronization words different from each other and have time slot sharing and frequency channel sharing (including a case that the frequency is not shared) time-divided CDMA signal with the TDMA signal.

Figure 2:
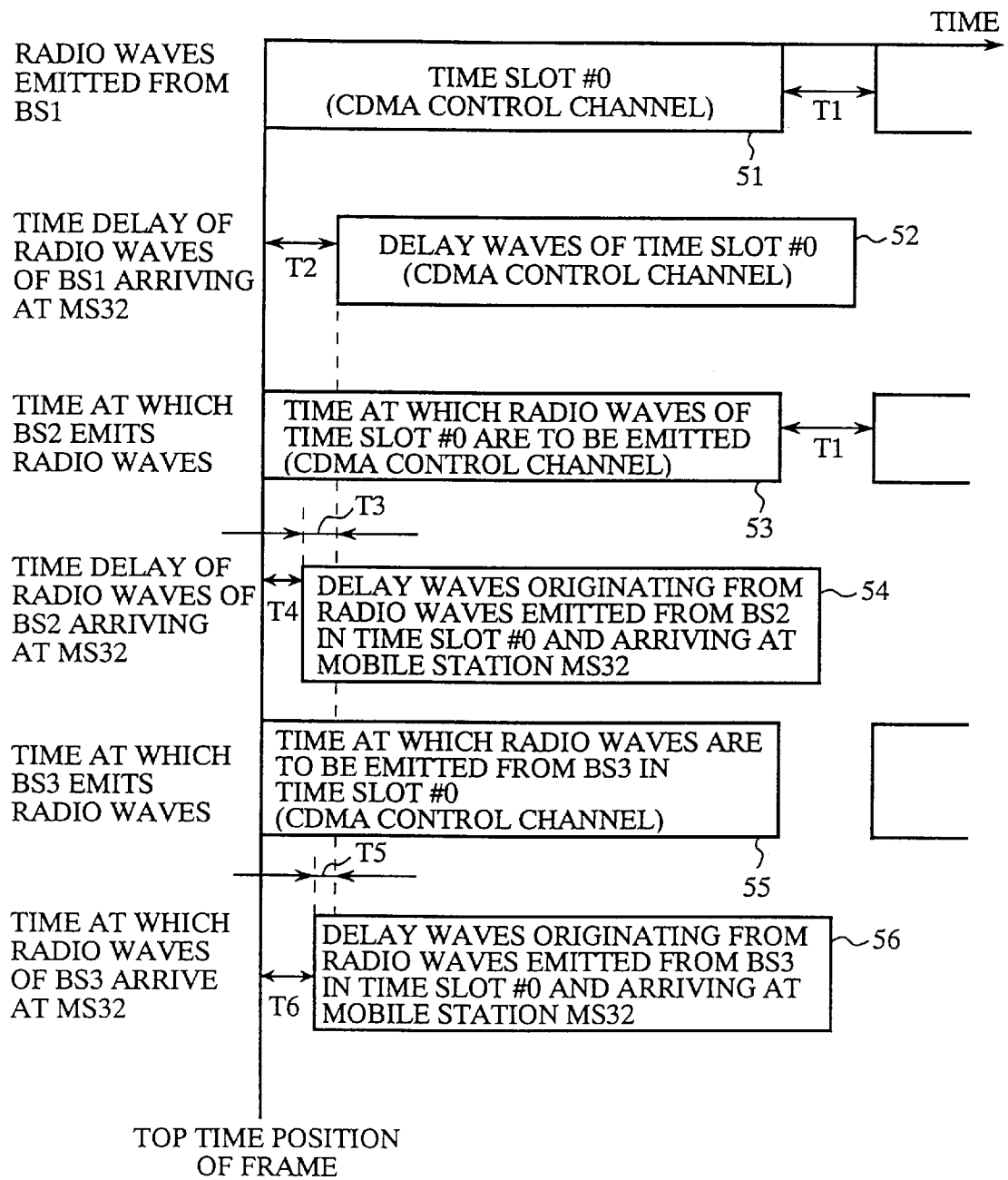
FIG. 2 is a diagrammatic view illustrating a relationship of time delays at a mobile station of radio waves emitted from different radio base stations of the embodiment 1.

FIG. 2 is a time chart illustrating a relationship of time delays at a mobile station of radio waves emitted from different radio base stations. In FIG. 2, a relationship in time after radio waves of the burst type emitted from the radio base stations 1, 2 and 3 (BS1, BS2 and BS3) arrive at the mobile station 32 (MS32) where the mobile station 32 is present at a position shown in FIG. 1.

Now, it is assumed that in FIG. 1 the mobile station 32 is radio connected to and is communicating with the radio base station 1. In this instance, radio waves of a time-divided CDMA burst signal emitted from the radio base station 1 arrive at the mobile station 32 by a delay time based on the distance between the radio base station 1 and the mobile station 32. In FIG. 2, the radio waves emitted from the radio base station 1 are indicated as a burst 51 of a "TIME SLOT #0", and the radio waves arriving at the mobile station 32 by the delay time are indicated as a burst 52 of a "DELAYED WAVE OF TIME SLOT #0". Further, the time delay is indicated by a time T2.

Figure 3:
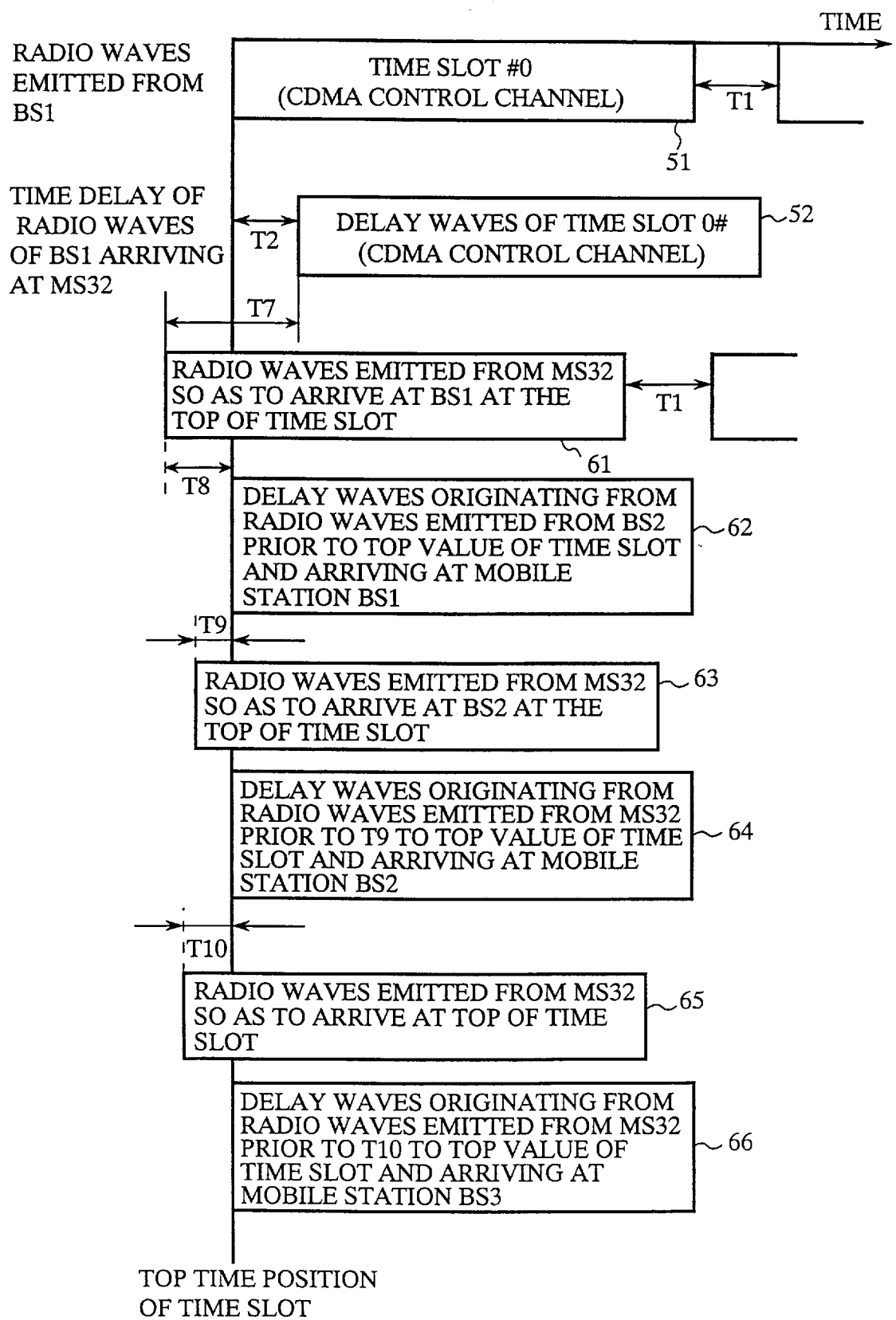
FIG. 3 is a diagrammatic view illustrating a relationship of time delays at radio base stations by which radio waves emitted from a mobile station in the embodiment 1 are received.

It is to be noted that the delay time T2 cannot be measured directly by the radio base station 1 or the mobile station 32. Therefore, as seen in FIG. 3, the emission time of radio waves of a time-divided CDMA burst signal to be transmitted from the mobile station 32 to the radio base station 1 is adjusted forwardly or backwardly in response to an instruction of the radio base station 1 so that, when the radio waves arrive at the radio base station 1, the top thereof may come to the top time position of a time slot. In this FIG. 3, the radio waves transmitted from the mobile station 32 are denoted as a burst 61 of "RADIO WAVES EMITTED FROM MOBILE STATION 32 SO AS TO ARRIVE AT RADIO BASE STATION 1 AT THE TOP OF TIME SLOT", and the radio waves arriving at the radio base station 1 are denoted as a burst 62 of "DELAYED WAVES ORIGINATING FROM RADIO WAVES EMITTED FROM MOBILE STATION 32 PRIOR TO TOP VALUE OF TIME SLOT AND ARRIVING AT RADIO BASE STATION 1".

In this instance, as seen in FIG. 3, the burst 61 to be transmitted by the mobile station 32 is emitted prior by a time T8 to the top time position of a time slot so that the burst 62 may arrive at the radio base station 1 at the top time position of the time slot. Since the time difference T8 between the burst 61 and the burst 62 is a time in which the radio waves propagate over the same distance, it is equal to the time difference T2 between the burst 51 and the burst 52 (T2=T8). It is to be noted that the time difference T7 between the top time position of the burst 52 and the top time position of the burst 61 can be measured in a chip rate unit by counting the number of clocks in the mobile station 32. The information obtained is transmitted from the mobile station 32 to the radio base station 1.

Here, since the time difference T2 between the burst 51 and the burst 52 and the time difference T8 between the burst 61 and the burst 62 are equal to each other as described above, the following expression (1) stands. Accordingly, the top time position of the time slot is present at the center of the time difference 17.

$$T7=T2+T8=2\times T2 \qquad (1)$$

It is to be noted that the distance D1 between the mobile station 32 and the radio base station 1 then is given, where the velocity of the radio waves is represented by C, by the following expression (2).

$$D1=(T7/2)\times C=T2\times C \qquad (2)$$

Meanwhile, a burst 53 of radio waves emitted from another radio base station, for example, the radio base station 2, arrives as a burst 54 at the mobile station 32 after lapse of the time T4 as shown in FIG. 2. Also in this instance, although the delay time T4 cannot be measured directly, the time difference T3 between the top of the burst 54 from the radio base station 2 and the top of the burst 52 from the radio base station 1 can be discriminated by counting clocks in the mobile station 32. Using the time difference T3, the distance D2 between the radio base station 2 and the mobile station 32 can be calculated, where the velocity of the radio waves is represented by C, in accordance with the following expression (3).

$$D2=T4\times C=(T2-T3)\times C \qquad (3)$$

Similarly, also the distance D3 between the other radio base station 3 and the mobile station 32 can be calculated from the time difference T5 between the top of a burst 56 originating from a burst 55 of radio waves emitted from the radio base station 3 and received after the time T6 and the top of the burst 52 from the radio base station 1, where the velocity of the radio waves is represented by C, in accordance with the following expression (4).

$$D3=T6\times C=(T2-T5)\times C \qquad (4)$$

It is to be noted that also such information is transmitted from the mobile station 32 to the radio base station 1 to which the mobile station 32 is radio connected at present.

Figure 4:
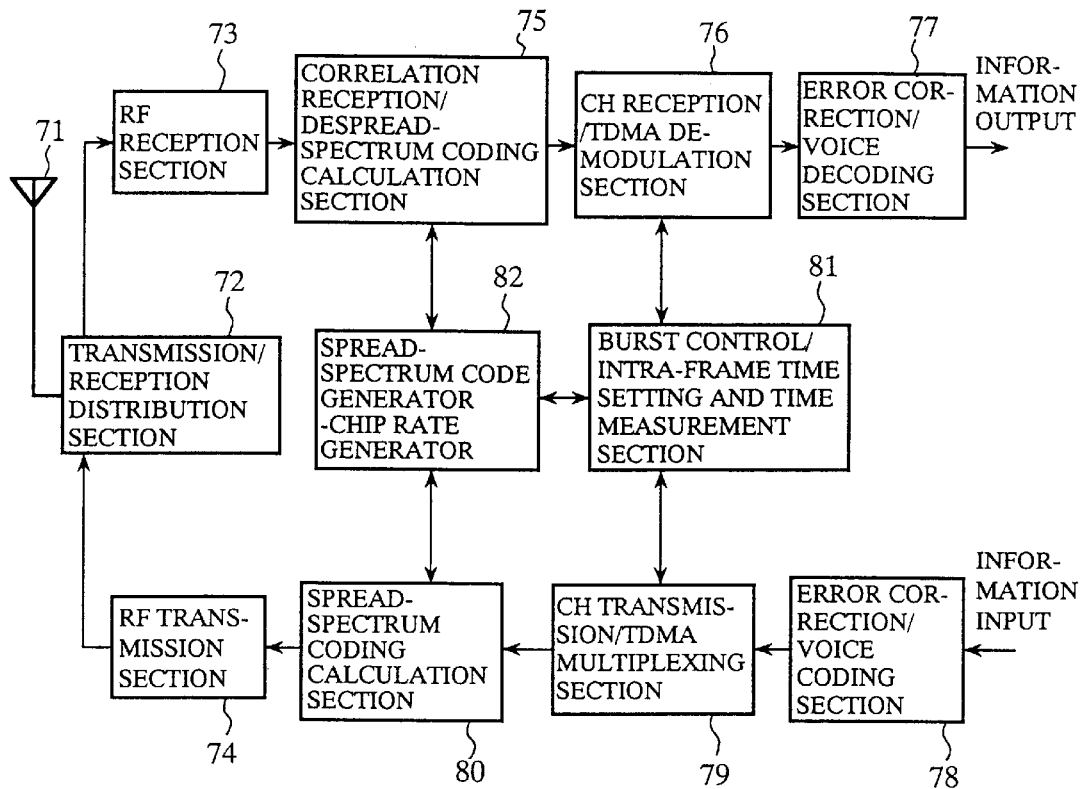
FIG. 4 is a block diagram showing a construction of a TDMA/time-divided CDMA mobile station in the embodiment 1.

Here, FIG. 4 is a block diagram showing a construction of a TDMA/time-divided CDMA mobile station which has such a function of measuring the distance between a mobile station and a radio base station as described above. Referring to FIG. 4, reference numeral 71 denotes an antenna, 72 a transmission/reception distribution section which effects distribution of a signal received by the antenna 71 and a signal to be transmitted from the antenna 71, 73 a RF (Radio Frequency) reception section which effects amplification of a signal received by the antenna 71, and 74 a RF transmission section which effects amplification of a signal to be transmitted from the antenna 71. It is to be noted that the transmission/reception distribution section 72 is realized, for the TDD, by a transmission/reception change-over switch, but for the FDD, by a filter diplexer.

Reference numeral 75 denotes a correlation reception/despread-spectrum coding calculation section having a (correlation reception) function of multiplying (reverse coding calculation) a spread-spectrum coded signal (CDMA signal) coded by and transmitted from a radio base station by a spread-spectrum code allocated to the self station to extract an original signal not in a spread-spectrum coded state. It is to be noted that, for the TDMA, since despread-spectrum coding is unnecessary, the correlation reception/despread-spectrum coding calculation section 75 does not operate. Reference numeral 76 denotes a channel reception/TDMA demodulation section (hereinafter referred to as CH reception/TDMA demodulation section) having a function of demodulating a despread-spectrum coded time-divided CDMA signal but, for a TDMA signal, demodulating a modulation signal and another function of extracting (demultiplexing) a necessary signal from a format of the demodulated signal and supplying the extracted signal to processing sections for the signal.

Reference numeral 77 denotes an error correction/voice decoding section serving as a digital-to-analog conversion section for correcting an error of information (a digital signal) supplied from the CH reception/TDMA demodulation section 76, decoding a voice signal from the information and supplying the decoded voice signal as an information output to a man-machine interface section not shown. Reference numeral 78 denotes an error correction/voice coding section serving as an analog-to-digital conversion section for digitally coding a voice signal supplied from the man-machine interface section and adding a code for error correction to the digitally coded voice signal.

Reference numeral 79 denotes a channel transmission/TDMA multiplexing section (hereinafter referred to as CH transmission/TDMA multiplexing section) having a function of multiplexing error correction coded digital voice information and other control information, incorporating the multiplexed information into a necessary time slot in a frame format and outputting a resulting signal. Reference numeral 80 denotes a spread-spectrum coding calculation section having a function of spectrum-spreading such multiplexed information on the frequency axis using a spread-spectrum code allocated to the self station and outputting resulting information to the RF transmission section 74. It is to be noted that, for the TDMA, since this spread-spectrum is not required, the spread-spectrum coding calculation section 80 does not operate.

Here, those sections are similar to those of a mobile station of an ordinary TDMA/time-divided CDMA system.

Further, reference numeral 81 denotes a burst control/intra-frame time setting and time measurement section having a function of controlling and adjusting the emission time of a burst signal (the burst 61 of FIG. 3 or the like) to be emitted from the self station based on information spread-spectrum coded by the spread-spectrum coding calculation section 80 to set in which time slot radio waves should be emitted (intra-frame time setting) and measuring (time measurement) the time difference T7 in FIG. 3 in a chip rate unit which is used in time-divided CDMA communication. The CH transmission/TDMA multiplexing section 79 outputs a signal at a time controlled and adjusted by the burst control/intra-frame time setting and time measurement section 81. Reference numeral 82 denotes a spread-spectrum code generator-chip rate generator which generate a chip rate to be used for such time-divided CDMA communication and a spread-spectrum code allocated to the self station and supplying them to the burst control/intra-frame time setting and time measurement section 81, correlation reception/despread-spectrum coding calculation section 75, spread-spectrum coding calculation section 80 and so forth.

Subsequently, operation of the mobile station having such a construction as described above is described.

Radio waves coded and emitted from a radio base station are received by the antenna 71 and distributed by the transmission/reception distribution section 72 so that they are sent to the RF reception section 73. The RF reception section 73 amplifies the signal received by the antenna 71 and sends it to the correlation reception/despread-spectrum coding calculation section 75. The correlation reception/despread-spectrum coding calculation section 74 multiplies the spread-spectrum coded time-divided CDMA signal sent thereto from the RF reception section 73 by a spread-spectrum code generated by the spread-spectrum code generator-chip rate generator 82 and allocated to the self station to effect despread-spectrum coding calculation to restore an original signal which is not in a spread-spectrum coded state.

The time division CDMA signal despread-spectrum coded by the correlation reception/despread-spectrum coding calculation section 75 is sent to and demodulated by the CH reception/TDMA demodulation section 76. The CH reception/TDMA demodulation section 76 further extracts a necessary signal from a format of the demodulated signal and supplies the thus extracted signal to processing sections for the we signal such as the error correction/voice decoding section 77 and the burst control/intra-frame time setting and time measurement section 81. The error correction/voice decoding section 77 performs error correction of the information with a digital signal supplied thereto from the CH reception/TDMA demodulation section 76 and effects analog conversion of the information to decode a voice signal, and supplies the voice signal as an information output to the man-machine interface section.

On the other hand, a voice signal supplied from the man-machine interface section is converted into a digital code by the error correction/voice coding section 78 and a code for error correction is added to the digital code, and a resulting signal is sent to the CH transmission/TDMA multiplexing section 79. The CH transmission/TDMA multiplexing section 79 multiplexes the digital voice information from the error correction/voice coding section 78 and other control information, incorporates the multiplexed information into a necessary time slot in a frame format, and outputs the signal at a corrected time of radio wave emission designated from the radio base station in accordance with control of the burst control/intra-frame time setting and time measurement section 81.

Here, the burst control/intra-frame time setting and time measurement section 81 controls and adjusts the emission time of a burst signal to be emitted from the self station, for example, the burst 61 shown in FIG. 3, in accordance with an instruction of the radio base station based on a signal supplied thereto from the CH reception/TDMA demodulation section 76. Further, the burst control/intra-frame time setting and time measurement section 81 sets, by intra-frame timing setting, in which time slot radio waves should be emitted, and further measures the time difference T7 in FIG. 3 by the time measurement function.

The signal outputted from the CH transmission/TDMA multiplexing section 79 is sent to the spread-spectrum coding calculation section 80, and the spread-spectrum coding calculation section 80 spectrum-spreads the signal on the frequency axis using the spread-spectrum code allocated to the self station. The spread-spectrum code used by the spread-spectrum coding calculation section 80 is generated by and supplied from the spread-spectrum code generator-chip rate generator 82. The signal spectrum-spread by the spread-spectrum coding calculation section 80 is amplified by the RF transmission section 74, distributed by the transmission/reception distribution section 72, and transmitted from the antenna 71.

In this manner, the time position of the burst 52 of delayed waves emitted from the radio base station 1 shown in FIG. 3 and arriving at the mobile station 32 is measured by the burst control/intra-frame time setting and time measurement section 81. On the other hand, the burst 61 of radio waves emitted from the mobile station 32 so that it may arrive at the radio base station 1 at the top time position of the time slot illustrated in FIG. 3 is constituted by the spread-spectrum code generator-chip rate generator 82 in response to an instruction of the burst control/intra-frame time setting and time measurement section 81.

Figure 5:
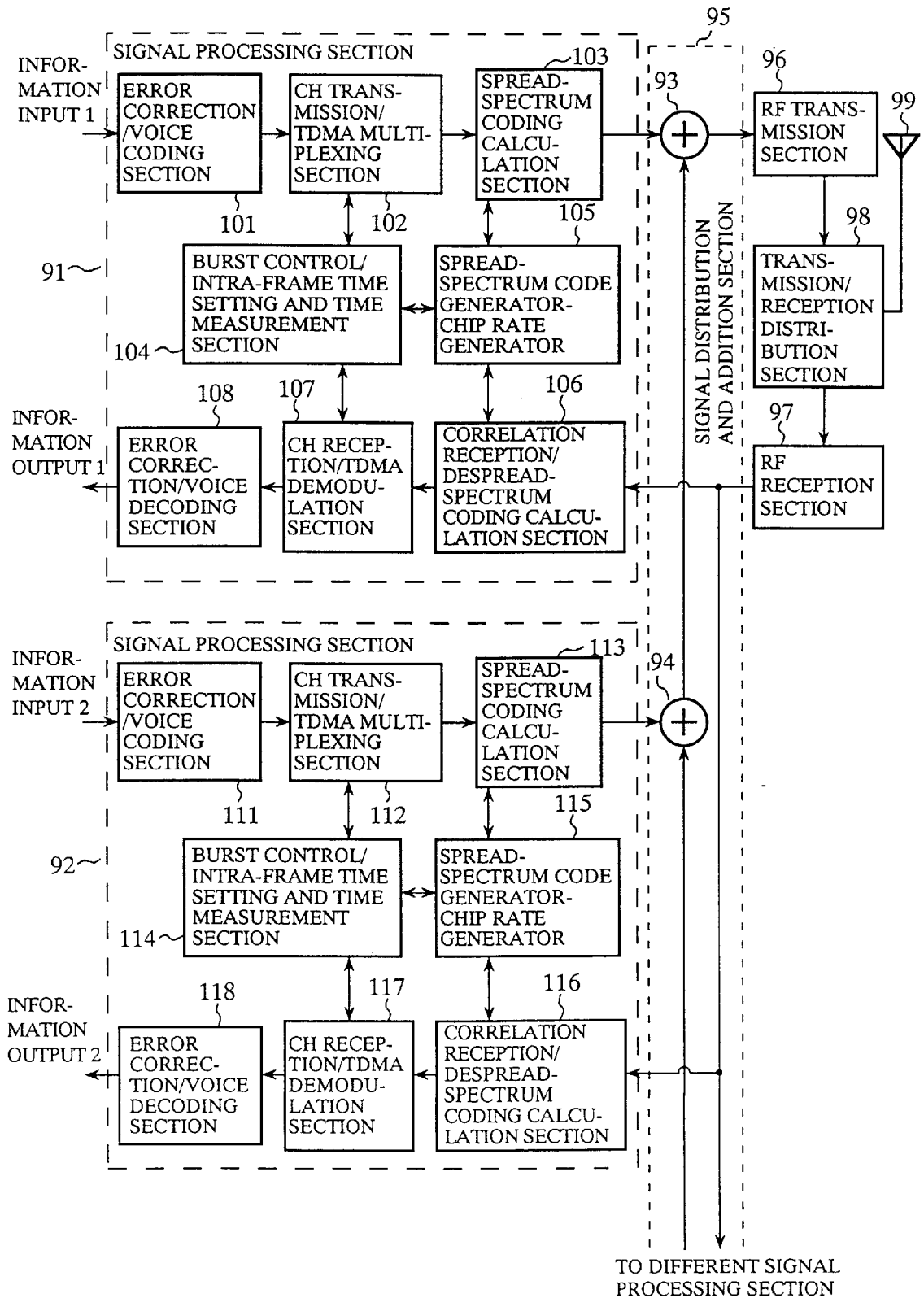
FIG. 5 is a block diagram showing a construction of the TDMA/time-divided CDMA base station in the embodiment 1.

Meanwhile, FIG. 5 is a block diagram showing a construction of the TDMA/time-divided CDMA radio base station. Referring to FIG. 5, reference numerals 91 and 92 denote each a signal processing section equivalent to the functions of the mobile station shown in FIG. 4 from which the antenna 71, transmission/reception distribution section 72, RF reception section 73 and RF transmission section 74 are omitted. However, the present radio base station system not only inputs and outputs a voice signal, but also has a function of transmitting and receiving control information of the entire system and so forth, and also the processing sections for a control signal are realized by similar functions to the signal processing sections 91 and 92 although they are somewhat different in software.

Reference numerals 93 and 94 denote each an adder for adding output signals from the signal processing sections including the signal processing sections 91 and 92. Reference numeral 95 denotes a signal distribution and addition section which performs distribution and addition of reception signals inputted from the signal processing sections 91 and 92 and so forth and transmission signals to be outputted from the signal processing sections 91 and 92 and so forth. Reference numeral 96 denotes a RF transmission section as a transmission section, 97 a RF reception section as-a reception section, 98 a transmission/reception distribution section, and 99 an antenna. It is to be noted that the RF transmission section 96, RF reception section 97, transmission/reception distribution section 98 and antenna 99 are equivalent in function to those of the mobile station shown in FIG. 4 although they may be different in size.

Meanwhile, in the signal processing sections 91 and 92, reference numerals 101 and 111 denote each an error correction/voice coding section, 102 and 112 denote each a CH transmission/TDMA multiplexing section, 103 and 113 denote each a spread-spectrum coding calculation section, 104 and 114 denote each a burst control/intra-frame time setting and time measurement section, 105 and 115 denote each a spread-spectrum code generator-chip rate generator, 106 and 116 denote each a correlation reception/despread-spectrum coding calculation section, 107 and 117 denote each a CH reception/TDMA demodulation section, and 108 and 118 denote each an error correction/voice decoding section, and they are equivalent to the corresponding sections shown in FIG. 4. It is to be noted that, in the signal processing sections 91 and 92, the error correction/voice coding sections 101 and 111 as analog-to-digital conversion sections and the error correction/voice decoding sections 108 and 118 as digital-to-analog conversion sections effect communication of an information signal in the form of a voice signal not with the man-machine interface section but with an analog network interface section (not shown).

Subsequently, operation of the mobile station constructed in this manner is described.

Here, basic operation of the signal processing sections 91 and 92 is similar to operation of the corresponding sections of the mobile station, and each of the burst control/intra-frame time setting and time measurement sections 104 and 114 effects supervision and time measurement so that the top time position of radio waves from a mobile station may be the top of a reception time slot and notifies a result of the measurement to the mobile station. The mobile station controls the top time position of radio waves to be emitted based on the information.

To this end, a signal outputted from the spread-spectrum coding calculation section 103 or 113 of the signal processing section 91 or 92 is added to a signal outputted from another signal processing section by the adder 93 or 94 and supplied to the RF transmission section 96. However, in the case of the TDMA, the intermediate frequency center frequencies of the signals outputted from the signal processing sections 91 and 92 are different from each other. This is because, even where a same time slot is used, this is intended to prevent collision of signals. It is to be noted that, in the case of the time-divided CDMA, since, even if a same time slot is used, two signals can be separated from each other if spread-spectrum codes are different from each other, it is allowable that the intermediate frequency center frequencies of the signals outputted from the signal processing sections 91 and 92 are identical with each other.

The signals added by the adders 93 and 94 are amplified by the signal distribution and addition section 95 and transmitted from the antenna 99 via the transmission/reception distribution section 98. On the other hand, a signal received by the antenna 99 is sent via the transmission/reception distribution section 98 to the RF reception section 97, by which it is amplified, whereafter it is inputted to the correlation reception/despread-spectrum coding calculation sections 106 and 116 and so forth of the signal processing sections 91 and 92.

In this manner, the radio base station can measure the distances to a plurality of mobile stations using a plurality of signal processing sections such as the signal processing sections 91 and 92. Further, the radio base station sends out information communicated with the mobile stations to the network side, that is, to the public switching telephone network 8 side from the mobile switching centers 6 and 7 shown in FIG. 1, and transmits information received from the network side to the mobile stations from the antenna 99.

It is to be noted that, while, in the foregoing description, the conversion section for performing inputting and outputting of information signals is described as an apparatus which performs forwarding and reception of information signals by voice signals to and from the analog network interface section using the error correction/voice coding sections 101 and 111 serving as analog-to-digital conversion sections and the error correction/voice decoding sections 108 and 118 serving as digital-to-analog conversion sections, as the conversion section for performing inputting and outputting of information signals, a conversion section of another conversion form may be used to effect forwarding and reception of information signals by some other signals to and from the network interface section, or those conversion sections may be used in a mixed condition.

Figure 6:
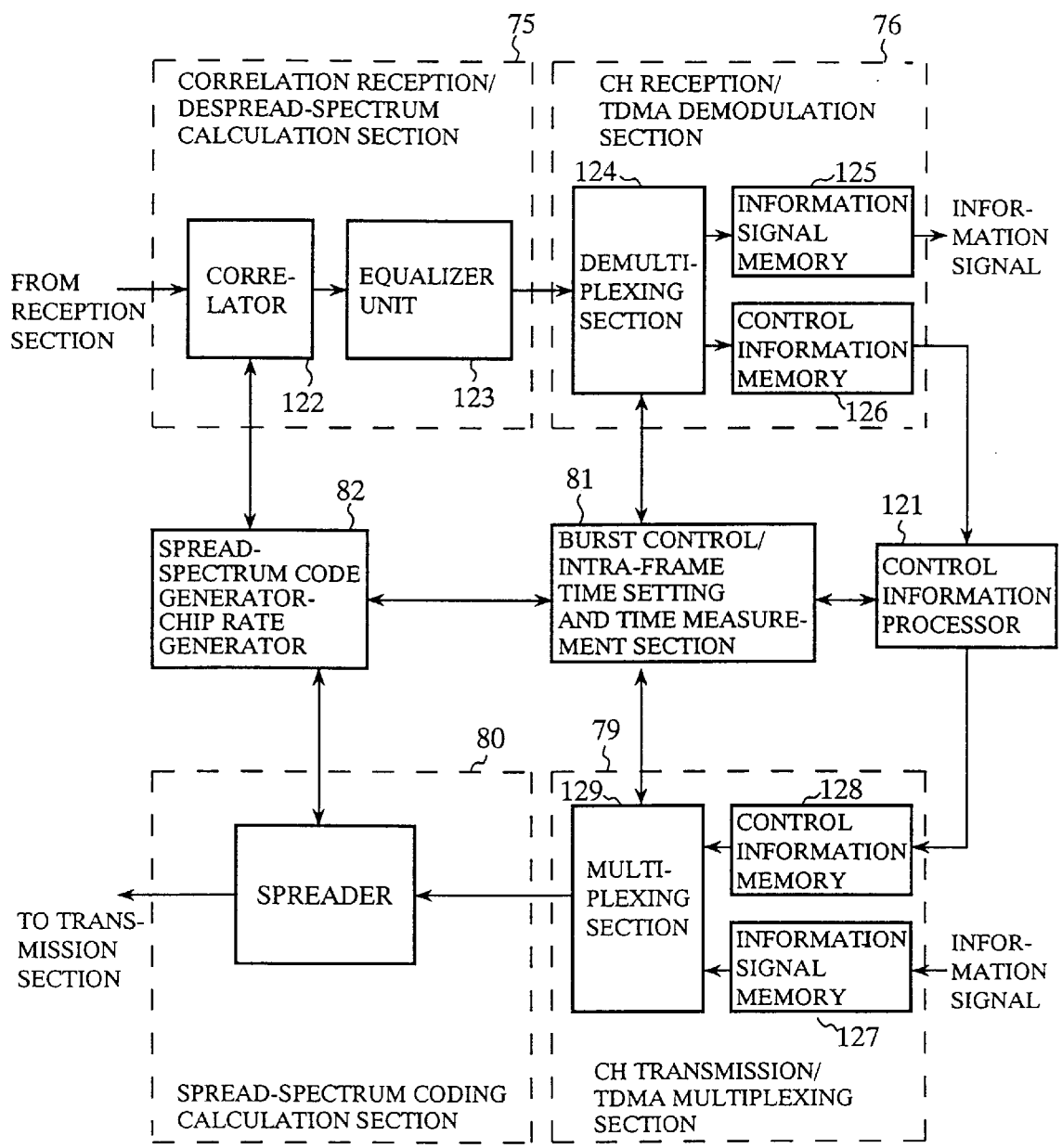
FIG. 6 is a block diagram showing an example of a burst time measuring and setting function of a mobile station of the embodiment 1.

Meanwhile, FIG. 6 is a block diagram showing an example of the burst time measuring and setting function of the mobile station. Referring to FIG. 6, reference numeral 121 denotes a control information processor which effects decoding of control information from a radio base station, instructs the mobile station of various functions such as, for example, distance measurement based on the decoded control information, and transmits the response to the radio base station. It is to be noted that this control information processor 121 is omitted in FIG. 4.

Reference numeral 122 denotes a correlator which multiplies a spread-spectrum coded signal transmitted from a radio base station by the same spread-spectrum code to extract a signal from which the spread-spectrum code has been removed, and 123 denotes an equalizer unit for removing interference of radio waves from a radio base station by a multiplex propagation line. The correlation reception/despread-spectrum coding calculation section 75 is composed of the correlator 122 and the equalizer unit 123.

Reference numeral 124 denotes a demultiplexing section for selecting a time slot destined for the self station from among a plurality of time slots and separating an information signal and control information included in the time slot destined for the self station, 125 denotes an information signal memory into which the separated information signal is temporarily stored, and 126 a control information memory into which the separated control information is temporarily stored. The CH reception/TDMA demodulation section 76 is composed of the demultiplexing section 124, information signal memory 125 and control information memory 126.

Reference numeral 127 denotes an information signal memory in which an information signal to be transmitted to a radio base station is temporarily stored, 128 a control information memory in which control information is temporarily stored, and 129 a multiplexing section for composing the information signal and the control information and multiplexing them into a time slot allocated to the self station. The CH transmission/TDMA multiplexing section 79 is composed of the information signal memory 127, control information memory 128 and multiplexing section 129.

Subsequently, operation of the mobile station having such a construction as described above is described.

Information transmitted thereto from a radio base station is inputted to the correlation reception/despread spectrum coding calculation section 75, in which correlation reception and despread-spectrum coding are performed by the correlator 122 and interference is removed by the equalizer unit 123. Then, the information is sent to the CH reception/TDMA demodulation section 76, in which an information signal and control information included in a time slot of the self station are separated by the demultiplexing section 124 and the information signal is stored into the information signal memory 125 while the control information is stored into the control information memory 126. The control information processor 121 decodes the control information stored in the control information memory 126 and sends a result of the decoding to the burst control/intra-frame time setting and time measurement section 81.

Meanwhile, in the CH transmission/TDMA multiplexing section 79, an information signal and control information stored in the information signal memory 127 and the control information memory 128 and to be sent to a radio base station are multiplexed by the multiplexing section 129 and sent to the spread-spectrum coding calculation section 80. The spread-spectrum code generator-chip rate generator 82 controls the top time position of a burst emission time of radio waves based on the information spread-spectrum coded by the spread-spectrum coding calculation section 80 to move the top time position forwardly or rearwardly in time based on the signal from the burst control/intra-frame time setting and time measurement section 81 having received the result of decoding from the control information processor 121.

As described above, according to the present embodiment 1, the distance between a radio base station and a mobile station can be measured accurately by measuring the time difference between the top time position of a burst of radio waves received from the radio base station by the mobile station and the top time position of a burst of radio waves transmitted by the mobile station so that the burst may arrive at the radio base station at the top of a time slot in a chip rate unit of the time-divided CDMA.

Embodiment 2

Subsequently, as an embodiment 2 of the present invention, measurement of the distance to a moving mobile station in a time-divided CDMA system is described.

Figure 7:
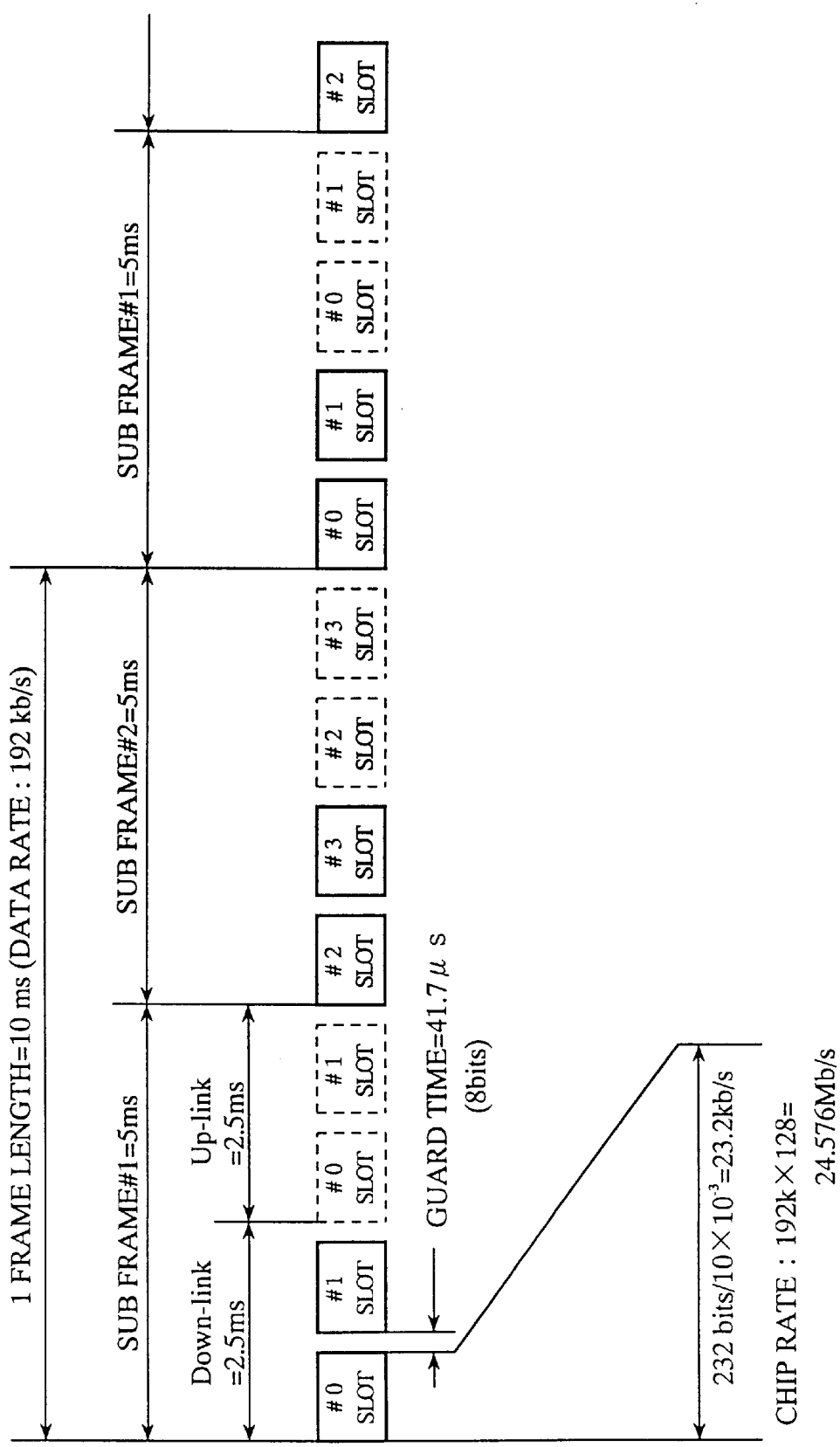
FIGS. 7 and 8 are diagrammatic views showing an example of a frame structure of a TDMA/time-divided CDMA communication system according to an embodiment 2 of the present invention.

FIG. 7 is a diagrammatic view illustrating an example of a frame structure of a TDMA/time-divided CDMA communication system for a PCS in the present embodiment 2. This frame structure is similar to that of the PHS (Personal Handy Phone System: a cordless system used in Japan), but is a little different in structure of time slots. In particular, the voice codec rate is assumed to be 16 kb/s, 8 kb/s or 4 kb/s. The data transmission rate is 192 kb/s, and the information rate per one time slot is 23.2 kb/s. By setting the chip rate to 192 kb/s×128=24.576 Mb/s, data of 192 kb/s mentioned above are spectrum-spreaded with orthogonal spread-spectrum codes having this chip rate. Accordingly, a plurality of time-divided CDMA signals having different orthogonal spread-spectrum codes in one time slot share a frequency channel, and the signals are used for communication between a ratio base station and a plurality of mobile stations.

In the present system, if the system is used as a TDMA system and frame synchronization is to be established, synchronization in a symbol unit is used, and accordingly, the synchronization accuracy relies upon the time of one symbol. In this instance, the one symbol length is $\frac{1}{96}$ ksymbol/s=10.41 s, and if it is assumed that the velocity of radio waves is 300 m/1 $\mu$s, then the distance which corresponds to one symbol time exceeds 3 km, and accordingly, even if the position of a mobile station is represented in this accuracy, this is not practical. On the other hand, where the system is operated with such a CDMA system that the modulation system is QPSK, the chip rate is 24.567 Mb/s, the symbol rate is 12.283 Msymbol/s, the one symbol length is 0.0814 $\mu$s, and the distance is 24.4 m. Accordingly, in this CDMA system, it is practical to measure the distance in a chip rate unit.

Figure 8:
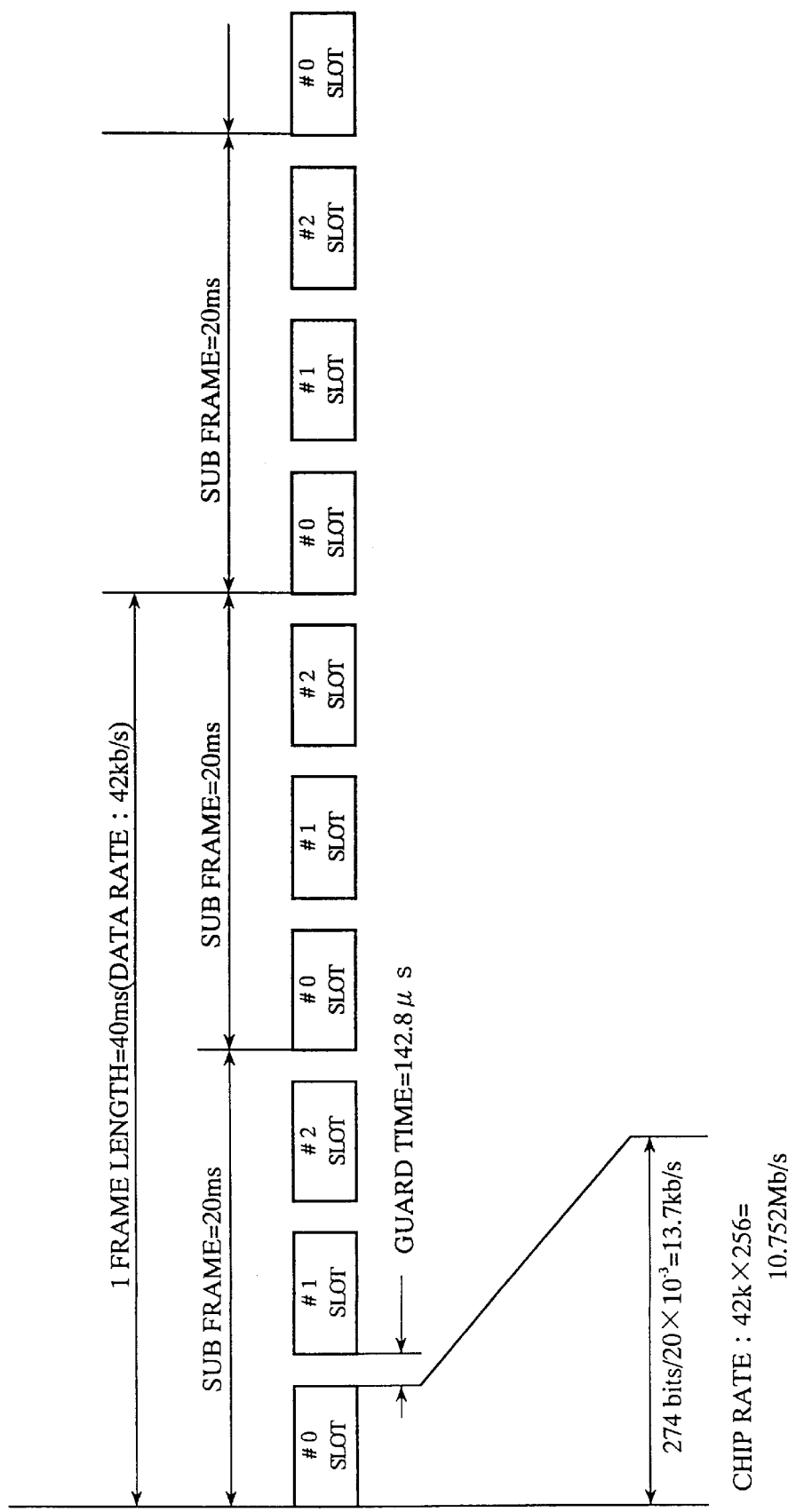

Further, an example of a frame construction of the PDC (Personal Digital Cellular Telecom System: a kind of cellular system) of Japan applied to a CDMA system is shown in FIG. 8. The chip rate is 10.752 Mb/s, the symbol rate is 5.376 Msymbol/s, the one symbol length is 0.186 $\mu$s, and the distance is 55.8 m. Since the PDC is a cellular system, if traveling of an automobile is taken into consideration, it has no problem in practical use that the position accuracy is 56 m.

Figure 9:
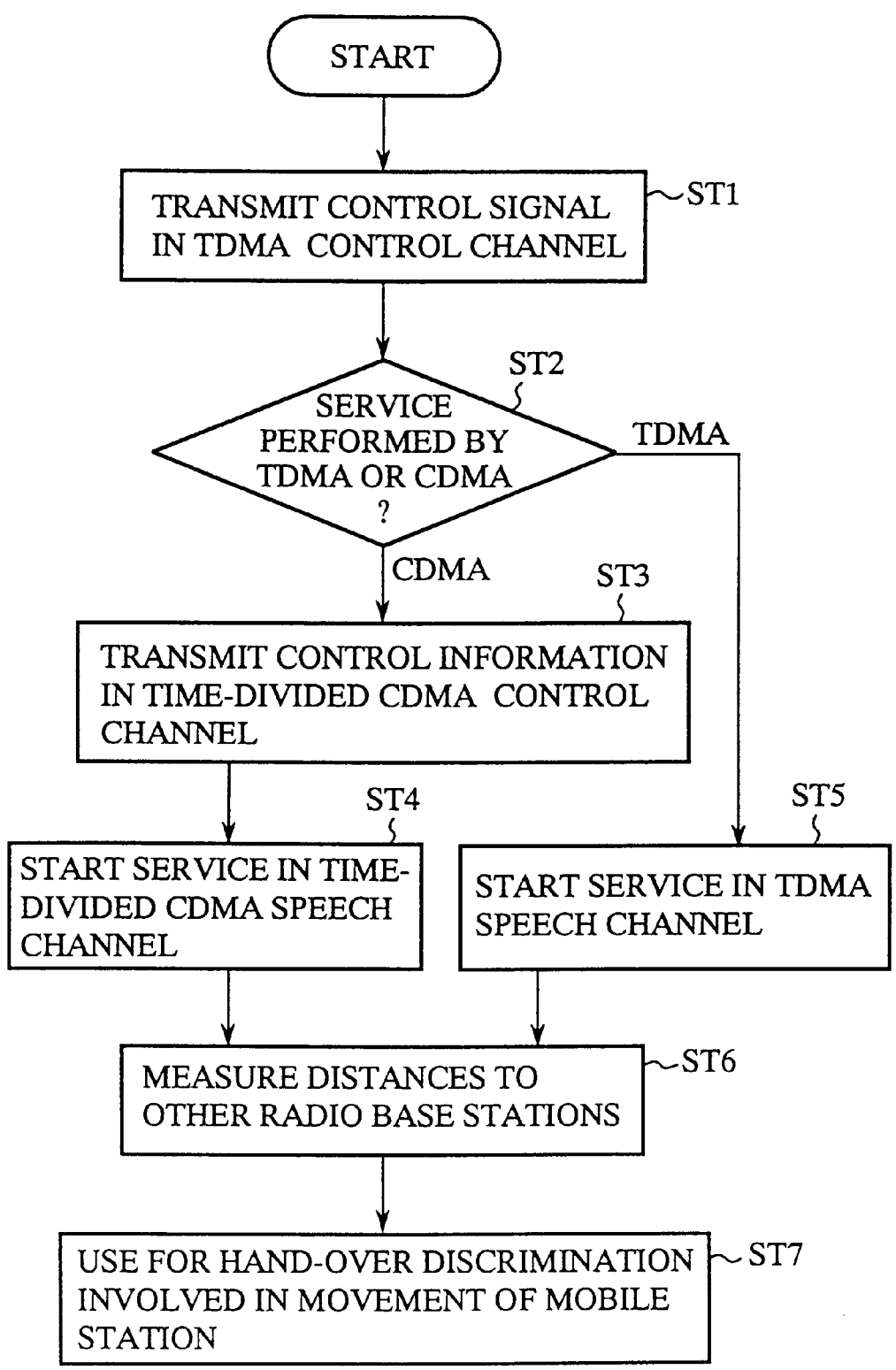
FIG. 9 is a flow chart illustrating a process of burst top time measurement and control of a mobile station in the embodiment 2.

Subsequently, position measurement in a chip rate unit by such a CDMA system as described above is described. FIG. 9 is a flow chart illustrating a process of burst top time measurement and control of a mobile station, and the process is performed by the apparatus shown in FIGS. 4, 5 and 6 in the embodiment 1 described hereinabove.

A radio base station transmits a control channel of the TDMA system and simultaneously transmits a control channel also of the time-divided CDMA system. However, a mobile station which does not acquire frame synchronization as yet first performs a connection starting procedure to the system by a control channel of the TDMA system. Accordingly, when the mobile station first participates in the system first, it receives, in step ST1 which is the first process, the TDMA control channel transmitted from the base station and transmits control information to the radio base station using a designated TDMA control channel based on the received information so that necessary control information is communicated between the mobile station and the radio base station through the bidirectional control channels.

In particular, in this step ST1, the mobile station receives a TDMA control channel of the object radio base station and transmits an up-r TDMA control channel based on a top value of a frame of the TDMA control channel. The radio base station receiving this up-link TDMA control channel measures the frame top time position of the received up-link signal and transmits an instruction to displace the frame top time position forwardly or backwardly in a TDMA transmission timing unit to the mobile station. After TDMA synchronization is completed, the mobile station measures the time difference between the top time positions of the transmission and reception bursts with the number of information symbols and transmits the value of the information symbol number to the radio base station.

Thereafter, in step ST2, the mobile station performs discrimination of whether the process should advance to a speech channel of the time-divided CDMA system or a speech channel of the TDMA system. To which one of the speech channels the process should advance is discriminated and processed based on a function of the mobile station, a traffic condition of a cell in which the mobile station is positioned at present and so forth.

When it is discriminated that the process should advance to a speech channel of the time-divided CDMA system, the mobile station performs, in step ST3, communication of control information with the radio base station using a time-divided CDMA control channel. During the communication by the time-divided CDMA control channel, time slot position control in a chip rate unit is performed simultaneously with the communication of control information. It is to be noted that this corresponds to measurement of the time different T7 in a chip rate unit as indicated in FIG. 3 in the embodiment 1.

In particular, in step ST3, the mobile station receives the time-divided CDMA control channel of the object radio base station and transmits an up-link time-divided CDMA control channel based on a top value of a frame of the time-divided CDMA control channel. The radio base station receiving the up-link time-divided CDMA control channel measures the frame top time position of the received up-link signal, and transmits an instruction to displace the time-divided CDMA transmission timing forwardly or rearwardly in a chip rate unit to the mobile station. After frame synchronization by the time-divided CDMA is completed, the mobile station measures the time difference between the top time positions of the time-divided CDMA transmission and reception bursts in a chip rate unit and transmits a value of the time difference to the radio base station.

Thereafter, when the process advances to the designated time-divided CDMA speech channel, a service is started using the time-divided CDMA speech channel in step ST4 which is the third step. It is to be noted that, in this instance, the radio base station successively receives a burst of the time-divided CDMA of the up-link during communication, successively measures the distance between the mobile station and the radio base station for each frame and instructs the mobile station of the information of the emitting position of the burst.

In this measurement, for the system for a PCS shown in FIG. 7, the symbol length of the time-divided CDMA signal chip rate is 0.814 $\mu$s, and approximately 10 seconds are required for a person to move over the distance 24.4 m on foot. Therefore, the burst emission time in a chip rate unit may be adjusted once per 10 seconds, and in order to control this, the occupying ratio of the process time is very low with both of the mobile station and the radio base station. Accordingly, the distance measurement by a chip rate unit does not make an excessive burden to the processor processing.

On the other hand, for the system for a cellular shown in FIG. 8, the symbol length of the time-divided CDMA signal chip rate is 0.186 $\mu$s, and approximately 2 seconds are required for an automobile to run over the distance 55.8 m at 100 km/h. Therefore, adjustment of the burst emission time in a chip rate unit may be performed once per 2 seconds, and in order to control this, the occupying ratio of the process time is very low with both of the mobile station and the radio base station. Accordingly, also in this instance, the distance measurement by a chip rate unit does not make an excessive burden to the processor processing.

On the other hand, when it is discriminated in step ST2 that the process should advance to a speech channel of the TDMA system, a service is started using the designated TDMA speech channel in step STS which is the second process. It is to be noted that, when to measure the distance between the mobile station and the radio base station which are communicating in the TDMA system with each other, where the mobile station and the radio base station have chip rate generators (the chip rate generators 82, 105 and 115 shown in FIGS. 4 and 5 of the embodiment 1) in the insides thereof, emission of an up-link signal burst from the mobile station to the radio base station is adjusted and controlled in a chip rate unit of the time-divided CDMA. In other words, this signifies that the time T7 in the inside of the mobile station illustrated in FIG. 3 of the first embodiment is measured in a chip rate unit and this information is transmitted to the radio base station via control information in the TDMA speech channel. This is easy with the mobile station and the radio base station of the TDMA/time-divided CDMA sharing system.

After a service is started by the time-divided CDMA control channel or the TDMA speech channel, the mobile station measures, in step ST6, the distances to a plurality of radio base stations other than the radio base station with which the mobile station is communicating by the method described above, and transmits the distances to the radio base station with which the mobile station is communicating. The information of the distances between the mobile station and the radio base stations is used for discrimination of hand-over involved in movement of the mobile station by the mobile switching center (MSC) together with information of reception electric field strengths from the mobile station at the individual radio base stations and reception electric field strengths at the mobile station of radio waves from the individual radio base stations. It is to be noted that this processing is described in detail in a different embodiment.

As described above, according to the present second embodiment, since communication of necessary control information is first performed with a radio base station by a designated TDMA control channel and then a service is performed using a designated time-divided CDMA speech channel or TDMA speech channel, when a mobile station first participates in this system, it is possible to establish frame synchronization at a TDMA symbol rate with which synchronization rough in time can be established regarding frame information from the radio base station first using the TDMA control channel and then establish synchronization at a chip rate of the time-divided CDMA which is higher in accuracy in time.

Embodiment 3

Subsequently, as an embodiment 3 of the present embodiment, a mobile station hand-over system under a condition that radio base stations are installed not at equal distances is described.

Hand-over which changes over a mobile station to the nearest radio base station is usually performed based on electric field strengths of received signals from the mobile station or radio base stations.

However, in a mobile communication system in which the distances between radio base stations are not necessarily equal to each other such as where radio base stations of different operators are installed in a mixed condition and cells (radio cover areas) of them overlap with each other or where a large number of radio base stations are installed in a arrow area because of the communication loads, the following situation exists: it cannot be discriminated that the distance from a mobile station to a neighboring radio base station is shortest when the transmission power to the mobile station or the radio base station is maximum.

For example, when the mobile station 32 of FIG. 1 moves in the south-east direction (here, the upward direction of FIG. 1 is the north) while communicating with the radio base station 2, the mobile station 32 approaches the neighboring radio base station 1 while the transmission power of the radio base station 2 to the mobile station 32 does not exhibit a maximum value. In an extreme case, also when the mobile station 32 comes very near to the radio base station 1, there is the possibility that the mobile station 32 keeps a communication channel with the radio base station 2. Accordingly, there is the possibility that it may not be sufficient to determine hand-over only based on the transmission power.

Figure 10:
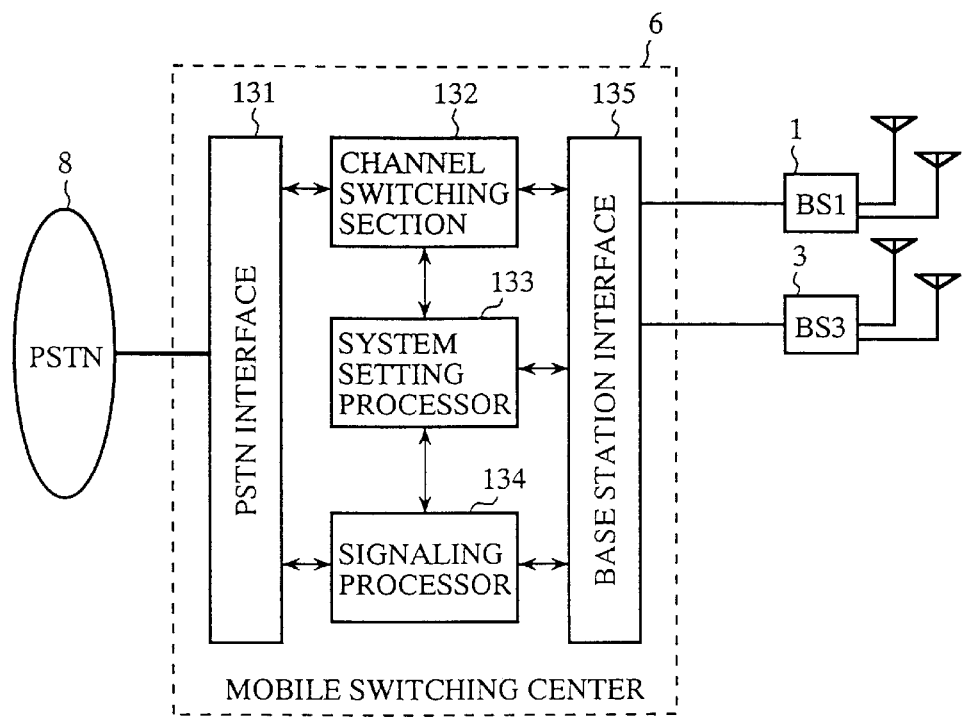
FIG. 10 is a block diagram showing a construction of a mobile switching center in an embodiment 3 of the present invention.

FIG. 10 is a block diagram showing a construction of a mobile switching center according to the embodiment 3 which controls mobile station hand-over under such a condition that radio base stations are installed not at equal distances as described above.

It is to be noted that, while this FIG. 10 shows the mobile switching center 6 of FIG. 1, the radio base stations 1 and 3 are connected to this mobile switching center while the radio base station 2 is connected to the different switching center 7. Referring to FIG. 10, reference numeral 1 denotes a radio base station (BS1), 3 another radio base station (BS3), 6 a mobile switching center (MCS01), and 8 a public system (PSTN). It is to be noted that those elements are same as those denoted by same reference numerals in FIG. 1.

Further, in the mobile switching center 6, reference numeral 131 denotes a PSTN interface which effects transmission and reception of information to and from the public system 8 of the mobile switching center 6 and transmission and reception of signaling signals (a dial signal, accounting information, password information and so forth). Reference numeral 132 denotes a channel switching section which transfers information (voice information/data information and so forth) sent from the public system 8 to the radio base station 1 or 3 in which the other party mobile station is present and transmits information transmitted thereto from the mobile station via the radio base station to the public system 8. Reference numeral 133 denotes a system setting processor which selects, from among radio systems which connect the radio base station and the mobile station such as the TDMA system or the time-divided CDMA system, a system with which the mobile station of the destination of connection can communicate, and instructs the radio base station and the mobile station to set the system. Reference numeral 134 denotes a signaling processor which processes the number of a mobile station to be connected, a password procedure for charging a mobile station of a destination of connection for the charge for a telephone call (to confirm whether or not the mobile station of the destination of connection is illegally used) and so forth. Reference numeral 135 denotes a base station interface which communicates information (voice information/data information and so forth) to be transmitted to a mobile station via a radio base station, signaling information with a radio base station, and system information which defines radio connection between a radio base station and a mobile station.

It is to be noted that the system setting processor 133 of the mobile switching center 6 includes a memory (not shown) in the inside thereof, and distance information between mobile stations and radio base stations around the mobile stations are stored in the memory. FIG. 11 is a diagrammatic view illustrating an example of the distance information stored in the memory, and here, it illustrates an example of distance information between the mobile station 32 (MS32) and radio base stations around the mobile station 32 in the system setting processor 133 of the mobile switching center 6. The memory of the system setting processor 133 of the mobile switching center 6 stores, as seen in FIG. 11, not only distance information to the radio base station 1 (BS1) and the radio base station 3 (BS3) but also distance information to the radio base station 2 (BS2). In other words, the mobile switching center 6 (MSC01) acquires also such information that the switching center 7 (MSC02) of another operator may start measurement from the switching center 7.

While the distances of the mobile station 32 to the radio base stations 1, 2 and 3 are illustrated in FIG. 11, if a speech channel is set between the mobile station 32 (MS32) shown in FIG. 1 and the radio base station 2 (BS2) when the mobile station 32 moves in the south-east direction until it comes to the position illustrated in FIG. 11, even though the mobile station 32 arrives at this position, it remains connected to the radio base station 2 and there is no trouble with the radio base station 2 itself. However, to the radio base station 1 (BS1), high power is transmitted in the proximity of the radio base station. In the case of the CDMA system, since such a situation makes a factor of deteriorating the system performance regarding the radio base station 1, it is necessary to eliminate a high power transmission condition in the proximity of a radio base station.

Subsequently, a process of eliminating such high power transmission of a mobile station in the proximity of a radio base station as descried above is described.

Here, FIG. 12 is a flow chart illustrating a process of controlling distance measurement between a mobile station and a neighboring radio base station in such a case as described above and starting of hand-over. It is to be noted that processing software for realizing the process is provided in the system setting processor 133 of the mobile switching center 6 shown in FIG. 10.

First, in step ST11, a mobile station measures the distance to an object radio base station with which a speech channel is set and the distances to a plurality of other neighboring radio base stations with which channel setting is possible, and transmits a result of the measurement to the object radio base station. The distances between the mobile station and the individual radio base stations are obtained each as a value which is equal to one half a time difference measured in step ST1, step ST4 or step ST5 of FIG. 9 in the description of the embodiment 2 above multiplied by the velocity of light.

For example, describing the mobile station 32 shown in FIG. 1 as an example, the mobile station 32 measures the distance to the radio base station 1 with which it is communicating using the method described hereinabove, and transmits resulting distance information to the radio base station 1. The mobile station 32 further measures the distances to the other adjacent radio base station 2, with which it is not communicating, using a similar method, and transmits the distance information to the radio base station 1. Furthermore, the mobile station 32 calculates the distances to other radio base stations with which channel setting is possible such as the radio base station 3 and transmits distance information to the radio base station 1.

Then, in step ST12, the mobile switching center 6 collects the distance information from the radio base station 1 and supervises presence of any other neighboring radio base station which is nearer to the mobile station 32 than the radio base station with which the mobile station 32 is communicating, and if it is discriminated in step ST13 that there is no nearer station, then the mobile station 32 returns its process to step ST11 to repeat the processing described above. On the other hand, if it is discriminated in step ST13 that there is a nearer station, then the mobile switching center 6 starts a procedure to hand over the destination of the communication of the mobile station to the nearest radio base station.

Here, if the mobile station 32 shown in FIG. 1 is communicating with the radio base station 1 and both of the radio base station 1 and the mobile station 32 have necessary reception signal strengths and besides the error rate of information communicated between them satisfies predetermined criteria, the mobile station 32 need not perform hand-over if the discrimination is based on conventional criteria. Actually, however, the mobile station 32 may possibly be nearer in distance to the radio base station 2 than to the radio base station 1 as seen in FIG. 1. Where there is a radio base station nearer to the mobile station in this manner, the mobile switching center 6 causes the mobile station 32 to start a procedure of hand-over to update the destination of communication of the mobile station 32 to the nearer radio base station (in the example shown, the radio base station 2).

Next, the process advances to step ST15, in which, also after the hand-over procedure is completed, the mobile station continues its measurement of the distances to the radio base stations therearound and informs the mobile switching center of the obtained distance information via the new radio base station handed over.

It is to be noted that, while, in the foregoing description, a case that a radio base station of the destination of the hand-over is owned by the same operator is described, the operator which owns the radio base station of the destination of the hand-over may be different from the operator which owns the radio base station with which the mobile station is communicating. In particular, where the radio base station nearest to the mobile station is owned by a different operator, the mobile switching center transmits a hand-over starting instruction to the nearest radio base station via the public system 8 and a mobile switching center owned by the different operator. Consequently, hand-over to the radio base station owned by the different owner can be performed by a process similar to that of the hand-over to the radio base station owned by the same operator.

As described above, according to the present embodiment 3, since a hand-over starting instruction is forwarded based on a result of accurate measurement of the distances between a mobile station and radio base stations, comparing with another case that determination of hand-over is performed based on a discrimination in regard to the reception signal strength or the like in such a field that cells of radio base stations of different operators overlap with each other or in such a field that a large number of radio base stations are installed within a narrow range from the reason of the communication load or the like, hand-over to a radio base station nearest to the mobile station can be performed with a higher degree of certainty, and it is possible to eliminate emission of unnecessarily strong radio waves from both of the mobile station and the radio base station emit.

Embodiment 4

Next, as an embodiment 4 of the present invention, a frame synchronization control channel system between radio base stations in the case of the TDD is described.

While the embodiment 1 is described such that the time difference between the top time position of a burst signal received by a mobile station from a radio base station and the top time position of another burst signal transmitted from the radio mobile station to the radio base station is measured, the present embodiment 4 is constructed such that the time difference between the top time position of a burst signal when burst radio waves transmitted from one radio base station (hereinafter referred to as radio base station) are received by another radio base station (hereinafter referred to as tributary base station) and the top time position of another burst signal transmitted from the tributary base station to the radio base station is measured by the tributary base station.

Figure 13:
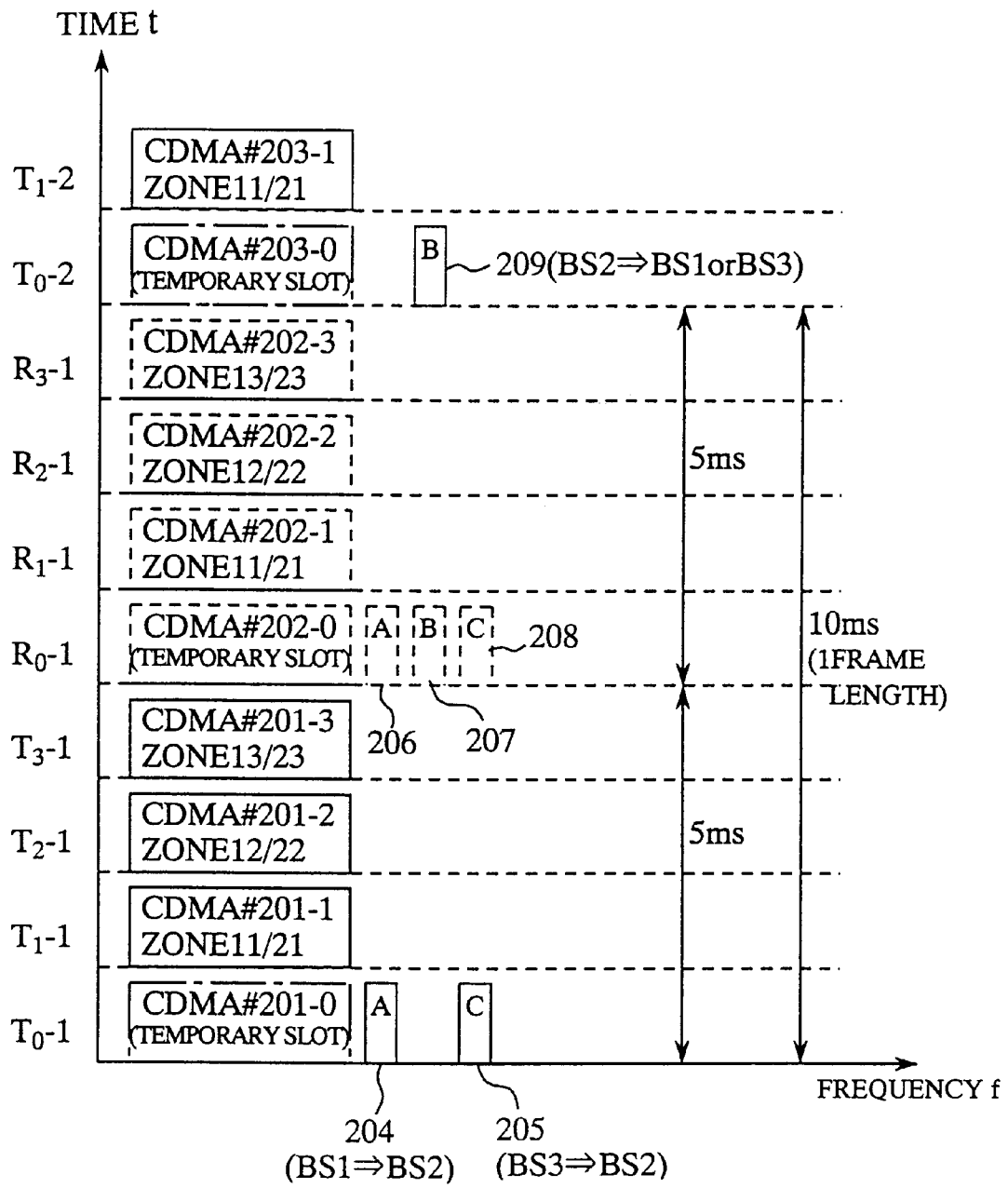
FIG. 13 is a diagrammatic view illustrating an example of TDMA control channels/time-divided CDMA control channels for frame synchronization in an embodiment 4 of the present invention.

FIG. 13 is a diagrammatic view illustrating an example of a TDMA control channel/time-divided CDMA control channel for frame synchronization between radio base stations of a plurality of different operations in a TDMA/time-divided CDMA coexistence TDD system.

In this FIG. 13, as a control channel, a burst 204 is used for the TDMA, but another burst #201-0 is used for the time-divided CDMA. Those two bursts are radio waves allocated to a transmission time slot $T_0$-1 and emitted from a radio base station (for example, the radio base station 1) and correspond to the burst 51 of FIG. 3. The tributary base station (for example, the radio base station 2) which receives the burst performs transmission of burst radio waves prior to the top time position of the time slot similarly to the burst 61 of FIG. 3.

Further, a control channel transmitted from the radio base station 2 to the radio base station 1 is a burst 209 for the TDMA, but a burst #203-0 for the time-divided CDMA. Those bursts are both allocated to a transmission time slot $T_0$-2.

It is to be noted that, in FIG. 13, the top time position of the transmission time slot $T_0$-1 and the top time position of the transmission time slot $T_0$-2 are spaced from each other by 10 ms (a fixed time difference). In particular, since the axis of ordinate is a time axis in FIG. 13, the lower side edge of the transmission time slot $T_0$-1 is the top time position of the burst 204 of the TDMA or the burst #201-0 of the time-divided CDMA emitted from the radio base station 1, and the lower side edge of the transmission time slot $T_0$-2 is the top time position of the burst 209 of the TDMA or the burst #203-0 of the time-divided CDMA emitted from the radio base station 2. While the two top time positions are displaced by 10 ms of the fixed time difference in this manner, in FIG. 3, the top time positions of the time slot are represented by the same time position eliminating the fixed time difference.

Next, a construction method for a control channel regarding a system which maintains frame synchronization between radio base stations in the case of a PCS which is a TDD similarly as in FIG. 7 and has the time slot structure illustrated in FIG. 13 and so forth are described.

Here, FIG. 14 is a diagrammatic view that an example of allocation of transmission (TX) and reception (RX) to radio base station time slots of a TDMA control channel/time-divided CDMA control channel illustrated in FIG. 13 is indicated in the form of a table. Referring to FIG. 13 described above and this FIG. 14, when a TDMA control channel 204 and a time-divided CDMA control channel #201-0 are transmitted to a transmission time slot $T_0$ of the radio base station 1, the radio base station 2 must receive this control channel signal at the transmission time slot $T_0$ of itself. Accordingly, when the radio base station 2 receives the control channel at the transmission time slot $T_0$, the radio base station 2 cannot transmit with this time slot.

In particular, the radio base station 2 receives a TDMA control signal in the TDMA time slot 204, receives a time-divided CDMA control signal in the time-divided CDMA time slot #201-0, transmits a TDMA control signal in the TDMA time slot 209, and transmits a time-divided CDMA control signal in the time-divided CDMA time slot #203-0.

Here, when the radio base station receives the time-divided CDMA control information signal from the tributary base station, it performs discrimination of whether or not the received burst signal is at an appropriate burst position. As a result, if it is discriminated that the received burst signal is at an appropriate burst position, the radio base station transmits the discrimination information to the tributary base station through the control channel. When the discrimination information from the radio base station is received, the tributary base station produces time difference information by subtracting the fixed time difference from the time difference between the top time position of the time-divided CDMA control signal burst transmitted from the radio base station and the top time position of the time-divided CDMA control signal burst to be transmitted from the tributary base station to the radio base station, and transmits the time difference information to the radio base station.

In particular, only after the radio base station detects coincidence with the top time position of the burst 62 illustrated in FIG. 3 (while it is illustrated in FIG. 3 that this burst 62 is emitted from the mobile station 32, here the mobile station is read as the tributary base station) and the coincidence detection information is transmitted from the radio base station to the tributary base station, the tributary base station transmits time difference information obtained by subtracting the fixed time difference (10 ms illustrated in FIG. 13) from the time difference between the top time position of the reception burst signal and the top time position of the transmission burst signal to the radio base station.

On the other hand, when the time-divided CDMA control information signal burst transmitted from the tributary base station arrives at the radio base station, if it is discriminated that the burst signal received by the radio base station is displaced from an appropriate burst position, that is, if the top time position of the burst 62 illustrated in FIG. 3 is displaced from the top time position of the time slot, the radio base station measures the displacement time in a chip rate unit of the time-divided CDMA system and transmits displacement information obtained to the tributary base station via the control channel. Based on the displacement information received from the radio base station, the tributary base station corrects the top time position of the time-divided CDMA control signal burst signal to be transmitted to the radio base station with reference to the top time position of the time-divided CDMA control signal burst signal transmitted from the radio base station, and emits a burst signal to the radio base position at the time corrected by the displacement.

It is to be noted that, in such frame synchronization between radio base stations as described above, as a cause by which synchronism is lost, if the frequency stability of an oscillator in a transmitter in the radio base station is $1\times10^{-6}$, then since the symbol rate of the system of FIG. 7 is 12.283 Msynbol/s, displacement of approximately 13 symbols per second occurs, and fluctuation of one symbol for each $1/13=0.769=76.9$ Msec occurs. Here, since the frame length is 10 ms, the timing must be corrected by 1 chip symbol once for 7 frames.

It is sufficient that the correction operation against chip rate displacement described above is performed once for 2 frames. In the construction of a control channel illustrated in FIGS. 13 and 14, synchronization correction between radio base stations and mobile station position measurement by a time-divided CDMA control channel is performed once for 2 frames, and a TDMA control channel is transmitted once for 2 frames so that it is used for initial acquisition for synchronization information and control information.

Here, while, in the embodiment 2 described above, synchronization displacement of a chip rate by a mobile station carried on a moving automobile or carried by a walking person is argued, since correction necessitated as a result of displacement of an internal oscillator in the transmitter is much higher in frequency than correction necessitated as a result of the synchronization displacement, the synchronization displacement correction can be made only against the displacement caused by the oscillator in the transmitter.

It is to be noted that, since the time-divided CDMA burst #201-0 illustrated in FIG. 13 is a transmission time slot in the TDD system, the tributary base station should originally perform transmission of a time-divided CDMA burst signal However, in order to receive a time-divided CDMA burst signal transmitted from the radio base station, transmission with the time-divided CDMA burst #201-0 is interrupted. In a time-divided CDMA time slot, many code multiplexed speech channels can be set and may communications (in this instance, transmissions) can be performed at a time. However, to establish frame synchronization between radio base stations is very important to such a system which effects communication by time division on a time frame as illustrated in FIG. 13. Accordingly, setting of a large number of speech channels is temporarily sacrificed, and the time-divided CDMA burst #201-0 is used for reception of one control channel from the radio base station.

As described above, according to the present embodiment 4, since a tributary base station measures the time difference eliminated by the fixed time difference from the time difference between the top time position of a reception burst signal and the top time position of a transmission burst signal in a chip rate unit and transmits the time difference information to a radio base station, in a TDD mobile communication system of the TDMA system and the time-divided CDMA system, frame synchronization between radio base stations is established and interference between time slots can be eliminated.

Embodiment 5

It is to be noted that, while, in the embodiment 4 described above, a frame synchronization control channel system between radio base stations for the TDD is described, as an embodiment 5 of the present invention, a frame synchronization control channel system between radio base stations for the FDD is described below.

Figure 15:
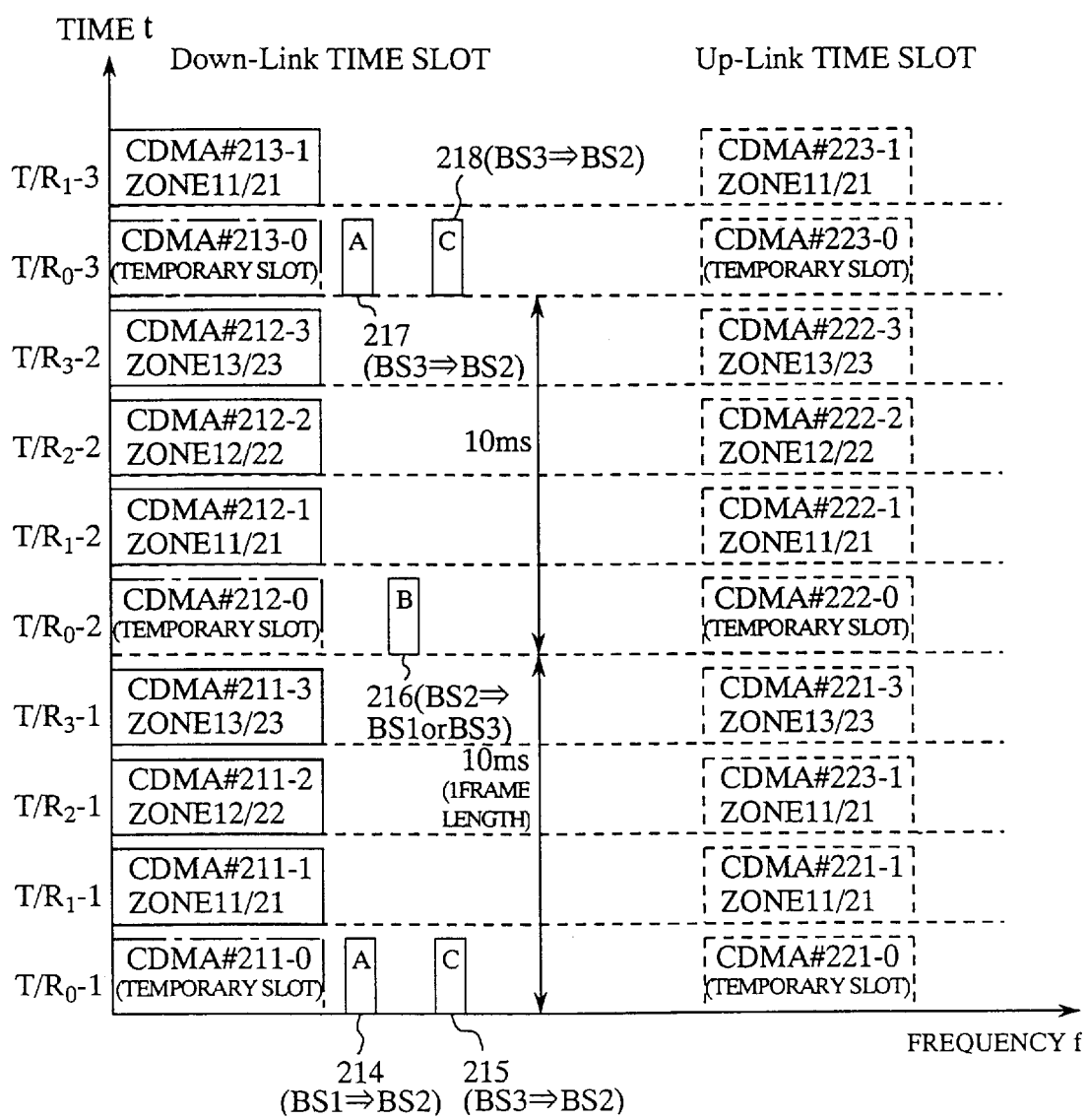
FIG. 15 is a diagrammatic view illustrating an example of TDMA control channels/time-divided CDMA control channels for frame synchronization in an embodiment 5 of the present invention.

FIG. 15 is a diagrammatic view illustrating an example of a TDMA control channel/time-divided CDMA control channel for frame synchronization between radio base stations of a plurality of different operators in a TDMA/time-divided CDMA coexistence FDD system. It is to be noted that, also in this FIG. 15, the top time position of a time slot T/R$_0$-1 and the top time position of another time slot T/R$_0$-2 are displaced by 10 ms from each other.

Subsequently, a construction method for a control channel regarding a system which maintains frame synchronization between radio base stations in the case of a cellular system which is an FDD similarly as in FIG. 8 and has the time slot structure illustrated in FIG. 15 and so forth are described. It is to be noted that FIG. 16 is a diagrammatic view which illustrates an example of transmission/reception (TX/RX) allocation to radio base station time slots of the TDMA control channel/time-divided CDMA control channel illustrated in FIG. 15 in the form of a table.

Referring to FIGS. 15 and 16, when a TDMA control channel 214 and a time-divided CDMA control channel #211-0 are transmitted to a transmission/reception time slot T/R$_0$-1 of the radio base station 1, a tributary base station must receive this control channel signal in a transmission/reception time slot T/R$_0$ of itself. Accordingly, when the tributary base station receives a control channel in the transmission/reception time slot T/R$_0$, the tributary base station cannot transmit with this time slot.

In particular, the radio base station 2 receives a TDMA control signal in a TDMA control channel 214, receives a time-divided CDMA control signal in a time-divided CDMA time slot #211-0, and transmits a TDMA control signal in a TDMA time slot 216 or transmits a time-divided CDMA control signal in a time-divided CDMA time slot #212-0.

Meanwhile, with the system shown in FIG. 8 which is an example of a time-divided CDMA system for a cellular different from that shown in FIG. 15 described above, the symbol rate is 5.376 MsynboL/s, and where the stability is $1 \times 10^{-6}$, displacement by approximately 5.4 symbols occurs for one second, and accordingly, correction by one symbol must be performed for $1/5.4 = 0.185 = 185$ ms. Since the frame length is 20 ms, from $185/20 = 9.2$, correction must be performed once for 9 frames.

It is sufficient if a correction operation against the chip rate displacement described above is performed once for 2 frames. In the construction of a control channel illustrated in FIGS. 15 and 16, synchronization correction between radio base stations and mobile station position measurement by a time-divided CDMA control channel is performed once for 2 frames, and in the remaining one of the two frames, a TDMA control channel is transmitted and used for initial acquisition for synchronization information and control information.

In particular, according to the example illustrated in FIG. 15, the radio base station 1 transmits, in the top transmission/reception time slot T/R$_0$-1 of a frame, a burst 214 of the TDMA control channel and a burst #211-0 of the time-divided CDMA control channel. However, in the top transmission/reception time slot T/R$_0$-2 of a next frame, transmission of a burst of the TDMA control channel and a burst of the time-divided CDMA control channel is not performed. Further, in the top transmission/reception time slot T/R$_0$-3 of a further next frame, a burst 217 of the TDMA control channel and a burst #213-0 of the time-divided CDMA control channel are transmitted. Thereafter, transmission/stopping of a burst of the TDMA control channel and a burst of the time-divided CDMA control channel are repeated alternately for each one frame in a similar manner.

It is to be noted that, in the top transmission/reception time slot T/R$_0$-2 of a frame in which a burst of the TDMA control channel and a burst of the time-divided CDMA control channel is not performed the radio base station 1 receives a burst 216 of the TDMA control channel transmitted from the radio base station 2 and a burst #212-0 of the time-divided CDMA control channel.

Further, for frame synchronization acquisition between radio base stations, a control signal of the tributary base station must be received in a time slot in which the radio base station should originally transmit a control channel as described above. Accordingly, the reason of such special use of time slots is that the radio base station in this instance has a function of a mobile station, and therefore, it relates only to a down-link, and no influence is had on an up-link channel by which a signal from a mobile station is transmitted.

Here, while, in the embodiment 2 described above, synchronization displacement of a chip rate by a mobile station carried on a moving automobile or carried by a walking person is argued, since correction necessitated as a result of displacement of an internal oscillator in the transmitter is much higher in frequency than correction necessitated as a result of the synchronization displacement, also in the case of the FDD, the synchronization displacement correction can be made only against the displacement caused by the oscillator in the transmitter similarly as in the case of the TDD.

Further, as illustrated in FIG. 16, also in the case of the FDD, transmission and reception of a TDMA control channel and a time-divided CDMA control channel used for frame synchronization between radio base stations are all performed on the down-link side, and the up-link side is not used. Therefore, in this frame synchronization process between radio base stations, no disturbance is hand on a transmission signal on the up-link side from a mobile station, and there is no necessity to limit transmission of a mobile station specifically for this object.

As described above, according to the present embodiment 5, since a tributary base station transmits, after it is discriminated by a radio base station that a reception burst is at an appropriate burst position, time difference information between the top time positions of burst signals transmitted from and received by the tributary base station to the radio base station and the radio base station transmits a TDMA control signal burst and a time-divided CDMA control signal burst in the top slot of every other frame, in an FDD mobile communication system of the TDMA system and the time-divided CDMA system, frame synchronization between radio base stations is established, and interference between time slots can be eliminated.

Embodiment 6

Subsequently, as an embodiment 6 of the present invention, frame synchronization establishment between a radio base station and a plurality of tributary base stations in the case of the TDD and the FDD is described.

Figure 17:
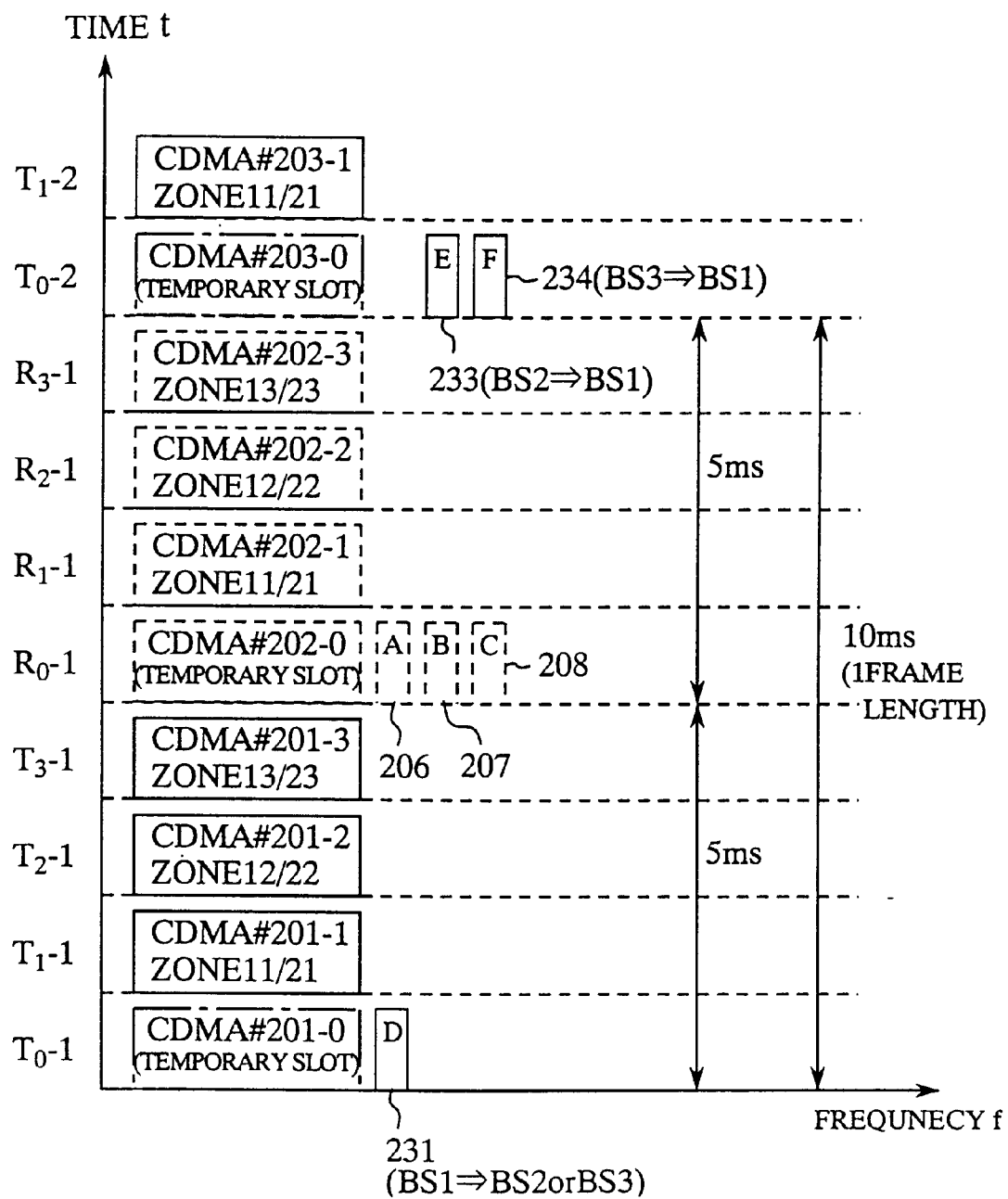
FIG. 17 is a diagrammatic view illustrating an example of TDMA control channels/time-divided CDMA control channels for frame synchronization in a TDMA/time-divided CDMA coexisting TDD system according to an embodiment 6 of the present invention.

FIG. 17 is a diagrammatic view illustrating an example of a TDMA control channel/time-divided CDMA control channel when, among radio base stations of a plurality of different operators, one radio base station establishes frame synchronization with a plurality of tributary radio base stations. Meanwhile, FIG. 18 is a diagrammatic view in which an example of transmission/reception (TX/RX) allocation of radio base station time slots of the TDMA control channel/time-divided CDMA control channel illustrated in this FIG. 17 is illustrated in the form of a table.

First, a process in which one radio base station establishes frame synchronization with a plurality of tributary base stations in a TDD system is described with reference to FIGS. 17 and 18.

As seen in FIGS. 17 and 18, when synchronization information is to be propagated from the radio base station 1 (BS1) to the tributary base station 2 (BS2) and the tributary base station 3 (BS3), the radio base station 1 transmits a TDMA control signal burst and a time-divided CDMA control signal burst from a TDMA control channel and a time-divided CDMA control channel in a transmission time slot $T_0$-1, and each of the tributary base stations 2 and 3 receives the TDMA control signal burst or the time-divided CDMA control signal burst of the TDMA control channel or the time-divided CDMA control channel. In this instance, down-links for a control channel for frame synchronization between radio base stations are formed.

On the other hand, when synchronization information is to be transmitted from the tributary base station 2 or 3 to the radio base station 1, the tributary base station 2 or 3 transmits a TDMA control signal burst or a time-divided CDMA control signal burst from a TDMA control channel or a time-divided CDMA control channel in a transmission time slot $T_0$-2, and the radio base station 1 receives the TDMA control signal burst and the time-divided CDMA control signal burst of the TDMA control channel and the time-divided CDMA control channel. In this instance, up-links for a control channel for frame synchronization between radio base stations are formed It is to be noted that a basic process for frame synchronization establishment between radio base stations is similar to that in the case of the embodiment 4 described hereinabove.

Subsequently, a process that one radio base station establishes frame synchronization with a plurality of tributary base stations in an FDD system is described. It is to be noted that, also in this instance, a basic process for frame synchronization establishment between radio base stations is similar to that in the case of the embodiment 5 described above.

Figure 19:
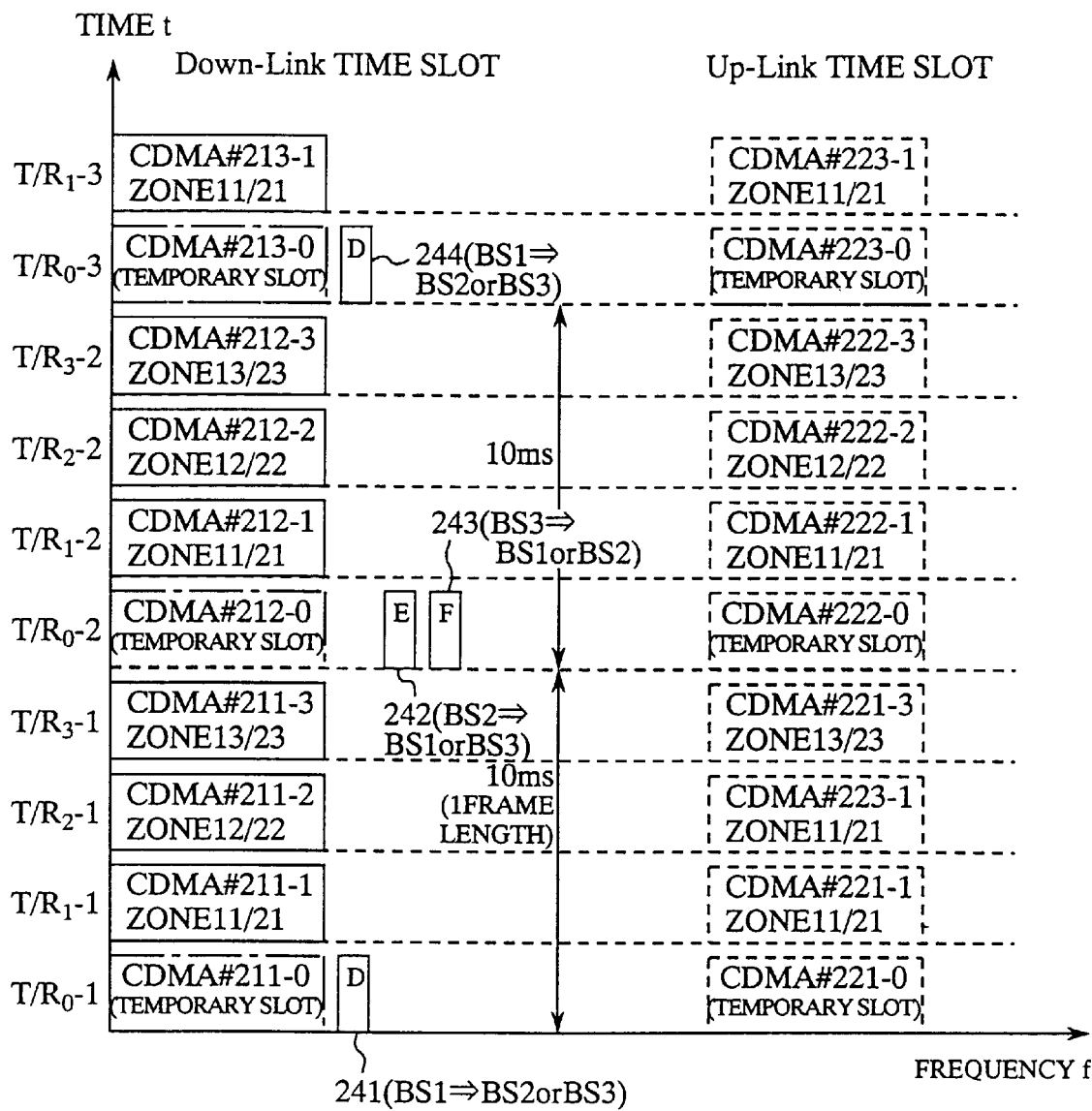
FIG. 19 is a diagrammatic view illustrating another example of TDMA control channels/time-divided CDMA control channels for frame synchronization in the TDMA/time-divided CDMA coexisting TDD system according to the embodiment 6 of the present invention.

Here, FIG. 19 is a diagrammatic view illustrating an example of a TDMA control channel/time-divided CDMA control channel in a TDMA/time-divided CDMA coexistence FDD system when, among radio base stations of a plurality of different operators, one radio base station establishes frame synchronization with a plurality of tributary base stations. Meanwhile, FIG. 20 is a diagrammatic view that an example of transmission/reception (TX/RX) allocation to radio base station time slots of the TDMA control channel/time-divided CDMA control channel illustrated in FIG. 19 is illustrated in the form of a table.

As seen in FIGS. 19 and 20, when synchronization information is to be transmitted from the radio base station 1 (BS1) to the tributary base station 2 (BS2) and the tributary base station 3 (BS3), the radio base station 1 transmits a TDMA control signal burst and a time-divided CDMA control signal burst from a TDMA control channel and a time-divided CDMA control channel in a transmission/reception time slot $T/R_0$-1, and each of the tributary base stations 2 and 3 receives the TDMA control signal burst or the time-divided CDMA control signal burst of the TDMA control channel or the time-divided CDMA control channel. In this instance, down-links for a control channel for frame synchronization between radio base stations are formed.

On the other hand, when synchronization information is to be transmitted from the tributary base station 2 or 3 to the radio base station 1, the tributary base station 2 or 3 transmits a TDMA control signal burst or a time-divided CDMA control signal burst from a TDMA control channel or a time-divided CDMA control channel in a transmission/reception $T/R_0$-2, and the radio base station 1 receives the TDMA control signal burst and the time-divided CDMA control signal burst of the TDMA control channel and the time-divided CDMA control channel. In this instance, up-links for a control channel for frame synchronization between radio base stations are formed.

As described above, according to the present embodiment 6, since a radio base station transmits a TDMA control signal burst and a time-divided CDMA control signal burst so that synchronization information is propagated from the radio base station to a plurality of tributary base stations and each tributary base station transmits a TDMA control signal burst or a time-divided CDMA control signal burst so that synchronization information is propagated from each tributary base station to the radio base station, frame synchronization can be established between one radio base station and a plurality of tributary base stations at a time in the accuracy in a time-divided CDMA chip rate unit, and interference between time slots from a plurality of radio base stations can be eliminated.

Embodiment 7

Subsequently, as an embodiment 7 of the present invention, a process of frame synchronization control between a radio base station and an adjacent tributary base station is described.

FIG. 21 is a flow chart illustrating an example of a control process of frame synchronization between a radio base station and an adjacent tributary base station. Where a plurality of adjacent tributary base stations are involved, this control process is executed repetitively for the individual tributary base stations.

In particular, in step ST21 of FIG. 21, a tributary base station first receives a TDMA control signal burst transmitted first by a TDMA control channel from the radio base station, and transmits a TDMA control signal burst of the tributary base station by a TDMA control channel of an uplink toward the radio base station with reference to the top time position of the received burst signal.

The radio base station receiving the TDMA control signal burst of the tributary base station sends, in step ST22, a transmission burst position control signal for controlling the TDMA control signal burst transmitted from the tributary base station so that it may be accommodated into a time slot into which it should be accommodated by a TDMA control channel of a down-link transmitted from the radio base station.

Then, in step S173, the radio base station confirms that the TDMA control signal burst of the uplink transmitted from the tributary base station in response to the transmission burst position control signal described above is entered in a time slot position on the time axis of the receiver input of the radio base station in which the transmission burst position control signal should be entered, and establishes frame synchronization between the radio base stations which use the TDMA control channels. After the radio base station establishes frame synchronization by the TDMA control channels, it transmits a time-divided CDMA control signal burst to the tributary base station.

When the time-divided CDMA control signal burst is received, the tributary base station transmits, subsequently in step ST24, a time-divided CDMA control signal of the self station to the radio base station by a time-divided CDMA control channel of an up-link with reference to the top time position of the received time-divided CDMA control signal burst. Then, in step ST25, the radio base station transmits a transmission burst position control signal to the tributary base station by the time-divided CDMA control channel of the down-link transmitted by the radio base station so as to control the time-divided CDMA control signal burst received from the tributary base station so that it may be accommodated in a time slot in which it should be accommodated. Frame synchronization between the radio base stations in a chip rate unit of the time-divided CDMA using the time-divided CDMA control channels is established in this manner.

After frame synchronization measurement in a chip rate unit of the time-divided CDMA between the radio base station and the tributary base station in steps ST23 and ST24 is completed once, the displacement time information is stored into a memory in the tributary base station or the mobile switching center. While this displacement time information increases in proportion to the distance between the radio base station and the tributary base station, since those radio base stations do not move, the displacement time information is fixed. Accordingly, if the tributary base station receives a time-divided CDMA control signal burst from the radio base station, then since the displacement time information from the top time position of the received burst is stored already, the top time position of a frame of the tributary base station is set with the displacement time information stored in the memory from the received burst signal.

Here, once measurement of the displacement time is completed, transmission of a time-divided CDMA control signal burst by the up-link from the tributary base station to the radio base station becomes unnecessary, and accordingly, the tributary base station thereafter stops transmission of a time-divided CDMA control signal burst by the up-link. Accordingly, since the radio base station need not use a time slot of a time-divided CDMA control signal for reception any more, it can transmit a time-divided CDMA communication signal burst using the time slot as an ordinary speech channel for the down-link. This process is illustrated in step ST26 of FIG. 21.

A time slot which can be used as an ordinary speech channel for the down-link as the radio base station 1 (BS1) described above need not receive a time-divided CDMA control signal burst by an uplink from the tributary base station 2 (BS2) any more is, for example, "RX" of a time-divided CDMA control channel in the row of BS1 of the column of $T_0$-2 in FIG. 18 and a time slot CDMA#203-0 in FIG. 17. Further, it is "RX" of a time-divided CDMA control channel in the row of BS1 of the column T/$R_0$-2 of FIG. 20 and a time slot CDMA#212-0 in FIG. 19.

Thereafter, if in step ST27, the speech traffic decreases to such a degree that a time slot of a time-divided CDMA control signal of the radio base station need not be utilized as a speech channel, then the radio base station instructs the tributary base station to transmit a time-divided control signal burst through the up-link. For example, in the midnight or the like, since the speech traffic decreases, such time zone is a situation suitable to effect measurement and confirmation of the displacement time information described above between radio base stations.

As described above, according to the present embodiment 7, since frame synchronization between radio base stations is established first using TDMA control channels and then using time-divided CDMA control channels and a displacement time between the top time positions of burst signals transmitted and received by a tributary base station is stored into a memory of the tributary base station or a mobile switching center, also in a situation in which updating of control information cannot be performed between the tributary base station and a radio base station, interference between time slots can be eliminated by utilizing the top time position of a received time-divided CDMA control channel and the information of the displacement time measured and stored in advance.

Embodiment 8

Subsequently, as an embodiment 8 of the present invention, a control process when frame synchronization between a radio base station and an adjacent tributary base station is established using TDMA control channels when the speech traffic becomes excessively large.

FIG. 22 is a flow chart illustrating an example of a control process of frame synchronization between a radio base station and an adjacent tributary base station where such a case that the speech traffic becomes excessively large is taken into consideration. Meanwhile, FIGS. 23 and 24 are diagrammatic views that the allocation of control signals in such an instance is indicated in the form of a table, and FIG. 23 illustrates an example of transmission/reception (TX/RX) allocation in a TDMA/time-divided CDMA coexistence TDD system while FIG. 24 illustrates an example of transmission/reception (TX/RX) allocation in a TDMA/time-divided CDMA coexistence FDD system.

In the following, a control process of frame synchronization between a radio base station and a tributary base station is described with reference to FIG. 22.

First in step ST31, the tributary base station receives, similarly as in the case of the embodiment 7, a TDMA control signal burst transmitted first by a TDMA control channel from the radio base station, and transmits a TDMA control signal burst of the tributary base station by a TDMA control channel of an up-link toward the radio base station with reference to the top time position of the received burst signal.

Then in step ST32, the radio base station sends a transmission burst position control signal for controlling the TDMA control signal burst transmitted from the tributary base station described above so that it may be accommodated into a time slot into which it should be accommodated by a TDMA control channel of a down-link transmitted from the radio base station, and confirms that the TDMA control signal burst of the up-link transmitted from the tributary base station is entered in a time slot position on the time axis of the receiver input of the radio base station in which the transmission burst position control signal should be entered by emission time adjustment of a transmission burst of the tributary base station based on the transmission burst position control signal. Consequently, frame synchronization between the radio base stations in which the TDMA control channels are used is established.

Then in step ST33, in a condition that frame synchronization between the radio base stations by the TDMA control channels is established and actual operation is performed, it is discriminated whether or not the speech traffic has changed to such a condition that a time-divided control channel of the tributary base station can be used. As a result, if the time-divided control channel is not in a usable condition, then the process returns to step ST32 to perform actual operation while the frame synchronization between the radio base stations in which TDM control channels are used is maintained.

On the other hand, if it is discriminated in step ST33 that the time-divided control channel is in a usable condition, then the process advances to step ST34, in which the radio base station transmits a time-divided CDMA control signal burst to the tributary base station.

Thereafter, similarly as in the case of the embodiment 7, the tributary base station receiving the time-divided CDMA control signal burst sends a time-divided CDMA control signal burst of the self control to the radio base station in step ST3S, and in step ST36, the radio base station transmits a transmission burst position control signal to the tributary base station to perform establishment of frame synchronization by time-divided CDMA control channels. Thereafter, in step ST37, measured displacement time information is stored, and transmission of a time-divided CDMA control signal burst since then is stopped. If the speech traffic decreases, then the radio base station instructs the tributary base station of transmission of a time-divided CDMA control signal burst which has been stopped till then.

Although it naturally is better that frame synchronization between radio base stations is performed at a time-divided CDMA chip rate by which a high degree of synchronization accuracy is obtained, when the speech traffic of the object radio base station is very high at the point of time and a time slot of the time-divided CDMA cannot be used for reception of time-divided CDMA control information as a control channel, the second best countermeasure is taken as follows: as described above, frame synchronization is established in a symbol rate unit of a TDMA control channel and, at a point of time when the speech traffic of the radio base station decreases, a time slot of the time-divided CDMA is allocated as a control channel and used to receive time-divided CDMA control information.

It is to be noted that, while it is illustrated in FIGS. 23 and 24 that one time slot is used commonly for transmission (IX) and reception (RX), in order to commonly use one time slot for transmission and reception, it is required to displace the respective frequencies by a necessary amount from each other and use a steep filter diplexer. However, since it is not necessary to argue the matter here, its description is omitted.

As described above, according to the present embodiment 8, since frame synchronization by TDMA control channels is repeated if time-divided CDMA control channels are not in a usable condition but frame synchronization by time-divided CDMA control channels is performed if the time-divided CDMA control channels are in a usable condition, also in a situation in which a time slot of the time-divided CDMA cannot be used for communication of control signals between radio base stations, at least the system can be operated by establishing frame synchronization between radio base stations using TDMA control channels and an increase in interference between time slots can be prevented.

Industrial Applicability

As described above, a mobile communication system according to the present invention is useful where it is used for measurement of the distance between a mobile station and a radio base station and for establishment of frame synchronization and also for measurement of the distance and establishment of frame synchronization between radio base stations in a mobile communication system which has time-divided CDMA signal channels (shared channels) time slot shared and frequency channel shared with FDMA/TDD and TMDA digital communication on the frequency axis and wherein a mobile station and a radio base station are radio connected to each other by duplex by the FDMA/TDD system, the multi-carrier TDMA system or the time-divided CDMA system which employs a modulation signal by a digital modulation system. Further, the mobile communication system can be applied not only to a mobile communication system wherein a mobile station and a radio base station are radio connected to each other, but also to another mobile communication system wherein a mobile station and a semi-fixed WLL station are radio connected to a radio base station.

What is claimed is:

1. A mobile communication system having a plurality of mobile stations and at least one radio base station in which bidirectional communication using a time-divided CDMA system is performed between said mobile stations and said at least one radio base station, wherein each of said mobile stations measures a time difference having a fixed period of time subtracted therefrom, between a time that a time-divided CDMA burst signal is received from said radio base station and a time that a time-divided CDMA burst signal is transmitted by that respective mobile station in response to an instruction of said radio base station so that the transmitted time-divided CDMA burst signal may arrive at said radio base station at a start time position of a time slot of said time-divided CDMA system, and transmits information of the measured time difference to said radio base station.

2. A mobile communication system having a plurality of mobile stations and at least one radio base station in which bidirectional communication is performed between said mobile stations and sad at least one radio base station using a TDMA/time-divided CDMA sharing system wherein a time slot of the time-divided CDMA system is inserted in time slots of a frame construction of a TDMA system, wherein each of said mobile stations measures a time difference having a fixed period of time subtracted therefrom, between a time that a time-divided CDMA burst signal is received from said radio base station and a time that a time-divided CDMA burst signal is transmitted by that respective mobile station in response to an instruction of said radio base station so that the transmitted time-divided CDMA burst signal may arrive at said radio base station at a start time position of a time slot of said TDMA/time-divided CDMA sharing system, and transmits information of the measured time difference to said radio base station.

3. A mobile communication system according to claim 2, wherein the time difference having a fixed period of time subtracted therefrom, between the start time position of the time-divided CDMA burst signal received from said radio base station by each of said mobile stations and the start time position of the time-divided CDMA burst signal transmitted from the mobile station to said radio base station is measured in a chip rate unit which is used in time-divided CDMA communication.

4. A mobile communication system according to claim 2, wherein each of said mobile stations is radio-connected to one radio base station, wherein during a communication, a time difference having a fixed period of time subtracted therefrom, is measured between a start time position of a time-divided CDMA burst signal received from any radio base station other than the one radio base station and the start time position of the time-divided CDMA burst signal received from the one radio base station to which the mobile station is radio connected, and wherein information of the measured time difference is transmitted to the one radio base station to which the mobile station is radio connected.

5. A mobile communication system according to claim 2, wherein each of said mobile stations includes:

a correlation reception/despread-spectrum coding calculation section for extracting an original signal, which is not in a spread-spectrum coded condition, from a spread-spectrum coded signal sent thereto from said radio base station;

a channel reception/TDMA demodulation section for demodulating a time-divided CDMA signal despread-spectrum coded by said correlation reception/despread-spectrum coding calculation section and extracting a necessary signal from a format of a signal obtained by the demodulation;

a digital-to-analog conversion section for decoding an information signal from the signal extracted by said channel reception/TDMA demodulation section into an analog signal and forwarding the analog signal to a man-machine interface section;

an analog-to-digital conversion section for coding an information signal from said man-machine interface section into a digital code signal;

a channel transmission/TDMA multiplexing section for multiplexing the signal coded by said analog-to-digital conversion section;

a spread-spectrum coding calculation section for spectrum-spreading the information multiplexed by said channel transmission/TDMA multiplexing section on a frequency axis using a spread-spectrum code allocated to the self station;

a burst control/intra-frame time setting and time measurement section for controlling and adjusting an emission time of a burst signal which emits the information spread-spectrum coded by said spread-spectrum coding calculation section in response to an instruction of said radio base station and measuring the time difference, eliminated by the fixed time difference, between the top time position of the time-divided CDMA burst signal received from said radio base station and the top time position of the time-divided CDMA burst signal transmitted to said radio base station in a chip rate unit which is used in time-divided CDMA communication; and a spread-spectrum code generator-chip rate generator for generating a chip rate to be used for the time-divided CDMA communication and the spread-spectrum code allocated to the self station and for supplying the chip rate and the spread-spectrum code to said burst control/intra-frame time setting and time measurement section or said correlation reception/despread-spectrum coding calculation section and spread-spectrum coding calculation section.

6. A mobile communication system according to claim 2, wherein said radio base station includes:

a plurality of signal processing sections each including a correlation reception/despread-spectrum coding calculation section for extracting an original signal from a spread-spectrum coded signal, a channel reception/TDMA demodulation section for demodulating a despread-spectrum coded time-divided CDMA signal and extracting a necessary signal, a conversion section for decoding the extracted signal into an information signal and outputting the information signal to a network interface section, another conversion section for coding an information signal inputted from said network interface section, a channel transmission/TDMA multiplexing section for multiplexing the coded signal, a spread-spectrum coding calculation section for spectrum-spreading the multiplexed information on a frequency axis, a burst control/intra-frame time setting and time measurement section for controlling and adjusting an emission time of a burst signal which emits the spread-spectrum coded information and for performing time setting and time measurement in a frame, and a spread-spectrum code generator-chip rate generator for generating a chip rate to be used for the time measurement and the spread-spectrum code allocated to the self station; and a signal distribution and addition section for adding signals outputted from said signal processing sections and outputting a result of the addition to a transmission section and for distributing a signal received by a reception section to said signal processing sections.

7. A mobile communication system according to claim 6, wherein in at least one of said signal processing sections of said radio base station, said conversion section for decoding the information signal is constructed as a digital-to-analog conversion section for decoding the signal extracted by said channel reception/TDMA demodulation section into an analog information signal and outputting the analog information signal to an analog network interface section, and said conversion section for coding an information signal is constructed as an analog-to-digital conversion section for coding an information signal inputted from said analog network interface section into a digital code signal.

8. A mobile communication system according to claim 5, wherein said channel reception/TDMA demodulation section of each of said mobile stations includes a demultiplexing section for separating an information signal and control information included in a time slot selected from among a plurality of time slots and destined for the self station, an information signal memory for temporarily storing the information signal and a control information memory for temporarily storing the control information, wherein said channel transmission/TDMA multiplexing section includes an information signal memory for temporarily storing an information signal to be transmitted, a control information memory for temporarily storing control information to be transmitted, and a multiplexing section for composing the information signal and the control information and multiplexing the composed signal in a time slot allocated to the self station, and wherein the mobile station includes a control information processor for decoding the control information from said radio base station, instructing the mobile station of various functions based on the decoded control information and transmitting a response to the control information to said radio base station.

9. A mobile communication system having a plurality of mobile stations and at least one radio base station in which bidirectional communication is performed between said mobile stations and said at least one radio base station using a TDMA/time-divided CDMA sharing system wherein a time slot of the time-divided CDMA system is inserted in time slots of a frame construction of a TDMA system, wherein each of said radio base stations includes:

a first process of receiving, when first participating in said system, a TDMA control channel transmitted from said radio base station, transmitting control information to said radio base station using a designated TDMA control channel based on the received information, and performing communication of necessary control information with said radio base station via the bidirectional TDMA control channels, a second process of communicating, when a TDMA speech channel is designated, using the TDMA speech channel, and a third process of communicating by using the time-divided CDMA speech channel when a time-divided CDMA speech channel is designated.

10. A mobile communication system according to claim 9, wherein in said first process of each of said mobile stations, after said radio base station receiving a TDMA control information signal burst from a respective mobile station discriminates that the received burst is at an appropriate burst position and transmits the discrimination information to the respective mobile station via the control channel, the mobile station measures a time difference between a start time position of a TDMA control signal burst transmitted from said radio base station and a start time position of a TDMA control signal burst transmitted from the respective mobile station to said radio base station in an information symbol rate unit and transmits the time difference information to said radio base station.

11. A mobile communication system according to claim 9, wherein in said second process of each of said mobile stations, after said radio base station receiving a TDMA speech information signal burst from a respective mobile station discriminates that the received burst is at an appropriate burst position and transmits the discrimination information to the respective mobile station via a control channel in a speech channel, the mobile station measures a time difference having a fixed period of time subtracted therefrom between a start time position of a TDMA speech signal burst transmitted from said radio base station and a start time position of a TDMA speech signal burst transmitted from the respective mobile station to said radio base station in a time-divided CDMA chip rate unit and transmits the time difference information to said radio base station.

12. A mobile communication system according to claim 9, wherein in said third process of each of said mobile stations, after said radio base station receiving a time-divided CDMA speech information signal burst from a respective mobile station discriminates that the received burst is at an appropriate burst position and transmits, if it is discriminated that the received burst is at an appropriate burst position, the discrimination information to the respective mobile station via a control channel in a speech channel, the mobile station measures a time difference having a fixed period of time subtracted therefrom, between a start time position of a time-divided CDMA speech signal burst transmitted from said radio base station and a start time position of a time-divided CDMA speech signal burst transmitted from the respective mobile station to said radio base station in a time-divided CDMA chip rate unit and transmits the time difference information to said radio base station.

13. A mobile communication system having a plurality of mobile stations and at least one radio base station in which bidirectional communication is performed between said plurality of mobile stations and sad at least one radio base station using a TDMA/time-divided CDMA sharing system that a time slot of the time-divided CDMA system is inserted in time slots of a frame construction of a TDMA system, wherein each of said mobile stations measures a time difference having a fixed period of time subtracted therefrom, between a start time position of a TDMA burst or a time-divided CDMA burst received from said radio base station and a start time position of a TDMA burst or a time-divided CDMA burst transmitted by that mobile station to said radio base station in a chip rate unit and transmits the time difference information to said radio base station, and wherein a mobile switching center which accommodates a plurality of radio base stations has a function of calculating distances between said radio base stations and said mobile stations based on the time difference information collected from said radio base stations and storing distance information obtained from said time difference information.

14. A mobile communication system according to claim 13, wherein said mobile switching center measures distances between each of said mobile stations and a plurality of radio base stations around each mobile station, supervises the measured distances, and if the distance to a respective mobile station is shorter from any other one of the radio base stations than from the radio base station to which the mobile station is connected, forwards to the respective mobile station a hand-over starting instruction so as to newly set a radio channel to the one radio base station.

15. A mobile communication system according to claim 14, wherein when said mobile switching center tries to forward a hand-over starting instruction to the radio base station nearest to the respective mobile station, if that radio base station is a radio base station of a different operator than the radio base station to which said respective mobile station is presently radio-connected, said mobile switching center transmits a hand-over starting instruction to the radio base station nearest to the respective mobile station via a public system and a mobile switching center of the different operator.

16. A mobile communication system having a plurality of mobile stations and a plurality of radio base stations in which bidirectional communication using a time-divided CDMA system is performed between said plurality of mobile stations and said plurality of radio base stations, wherein when a time-divided CDMA control signal burst transmitted from a radio base station is received by a tributary base station, said tributary base station measures a time difference having a fixed period of time subtracted therefrom, between a start time position of a time-divided CDMA burst signal received from said radio base station and a start time position of a time-divided CDMA burst signal transmitted from said tributary base station in response to an instruction from said transmitting radio base station so that a beginning of the time-divided CDMA burst signal may arrive at said tributary radio base position at a start time position of a time slot, and transmits the measurement information therefrom to said transmitting radio base station.

17. A mobile communication system having a plurality of mobile stations and a plurality of radio base stations in which bidirectional communication is performed between said plurality of mobile stations and said plurality of radio base stations using a TDMA/time-divided CDMA sharing system that a time slot of the time-divided CDMA system is inserted in time slots of a frame construction of a TDMA system, wherein when a TDMA control signal burst or a time-divided CDMA control signal burst transmitted from a radio base station is received by a tributary base station, said tributary base station measures a time difference having a fixed period of time subtracted therefrom, between a start time position of a TDMA burst signal or a time-divided CDMA burst signal received from said radio base station and a start time position of a time-divided CDMA burst signal transmitted from said tributary base station in response to an instruction from said radio base station so that a start of the time-divided CDMA burst signal may arrive at said radio base position at a start position of a time slot, and transmits the measurement information therefrom to said transmitting radio base station.

18. A mobile communication system according to claim 17, wherein a time difference having a fixed period of time subtracted therefrom, between start time positions of burst signals transmitted and received to and from said transmitting radio base station by said tributary base station is measured in a chip rate unit which is used in time-divided CDMA communication.

19. A mobile communication system according to claim 17, wherein said transmitting radio base station receives a time-divided CDMA control information signal burst transmitted from said tributary base station, discriminates whether or not the received burst is at an appropriate burst position, and transmits the discrimination information to said tributary base station via a control channel when it is discriminated that the received burst is at an appropriate burst position, and wherein said tributary base station transmits, after receiving the discrimination information, information of a time difference having a fixed period of time subtracted therefrom, between a start time position of a time-divided CDMA control signal burst transmitted from said radio base station and a start time position of a time-divided CDMA control signal burst transmitted from said tributary base station to said transmitting radio base.

20. A mobile communication system according to claim 18, wherein said radio base station receives a time-divided CDMA control information signal burst transmitted from said tributary base station, discriminates whether or not the received burst is at an appropriate burst position, and transmits the displacement information measured in a chip rate unit of said time-divided CDMA system to said tributary base station via a control channel when it is discriminated that the received burst is displaced from the appropriate burst position, and wherein said tributary base station corrects a top time position of a time-divided CDMA control signal burst to be transmitted from said tributary base station to said radio base station, based on the information of the displacement received from said radio base station, by a time corresponding to the displacement with reference to a top time position of a time-divided CDMA control signal burst transmitted from said tributary base station to said radio base station and transmits the corrected time-divided CDMA control signal burst to said radio base station.

21. A mobile communication system according to claim 20, wherein when said tributary base station receives a time-divided CDMA control information signal burst transmitted from said radio base station and detects a start time position of the received burst signal, said tributary base station stops transmission of a burst signal of a time slot which should originally be transmitted from said tributary base station, and receives the time-divided CDMA control signal burst transmitted from said radio base station.

22. A mobile communication system having a plurality of mobile stations and a plurality of radio base stations in which bidirectional communication is performed between said plurality of mobile stations and said plurality of radio base stations using a TDMA/time-divided CDMA sharing system that a time slot of the time-divided CDMA system is inserted in time slots of a frame construction of a TDMA system, and wherein a TDD mobile communication system in which a radio base station receives a time-divided CDMA control information signal burst transmitted from a tributary base station discriminates that the received burst is at an appropriate burst position, and transmits the discrimination information therefrom to said tributary base station via a control channel and said tributary base station transmits, after the discrimination information is received from said radio base station, information of a time difference between a start time position of a time-divided CDMA control signal burst transmitted from said radio base station and a start time position of a time-divided CDMA control signal burst transmitted from said tributary base station to said radio base station to said radio base station is constructed, and wherein said radio base station performs transmission of one or both of a TDMA control signal burst and a time-divided CDMA control signal burst once for two frames in a beginning slot of the frame.

23. A mobile communication system according to claim 22, wherein when said basic base station tries to transmit one or both of a TDMA control signal burst and a time-divided CDMA control signal burst once for two frames in a beginning slot, in a time slot in which a TDMA control signal burst and a time-divided CDMA control signal burst are not transmitted in a beginning slot thereof, said radio base station receives one or both of a TDMA control signal burst and a time-divided CDMA control signal burst transmitted from said tributary base station.

24. A mobile communication system according to claim 23, wherein in a time slot that said basic base station receives one or both of a TDMA control signal burst and a time-divided CDMA control signal burst transmitted from said tributary base station, even if the time slot is one or both of a TDMA speech signal burst and a time-divided CDMA speech signal burst which should originally be transmitted as a down-link by said radio base station, the transmission is stopped and one or both of the TDMA control signal burst and the time-divided CDMA control signal burst from said tributary base station are received.

25. A mobile communication system according to claim 17, wherein said transmitting radio base station has a function of transmitting, when synchronization information is to be propagated from said radio base station to a plurality of tributary base stations, one or both of a TDMA control signal burst and a time-divided CDMA control signal burst by one or both of a TDMA control channel and a time-divided CDMA control channel, and wherein each of said tributary base stations has a function of transmitting a TDMA control signal burst or a time-divided CDMA control signal burst by a TDMA control channel or a time-divided CDMA control channel when synchronization information is to be propagated from a respective tributary base station to said radio base station.

26. A mobile communication system having a plurality of mobile stations and a plurality of radio base stations in which bidirectional communication is performed between said plurality of mobile stations and said plurality of radio base stations using a TDMA/time-divided CDMA sharing system that a time slot of the time-divided CDMA system is inserted in time slots of a frame construction of a TDMA system, wherein when a time difference having a fixed period of time subtracted therefrom, between a start time position of a received burst position at a tributary base station of said plurality of base stations and a start time position of a TDMA burst signal or a time-divided CDMA burst signal transmitted from said tributary base station to said radio base station is measured in a chip rate unit of the time-divided CDMA by said tributary base station when a TDMA control signal burst or a time-divided CDMA control signal burst transmitted from a radio base station is received by said tributary base station, and the measurement information is transmitted from said tributary base station to said transmitting radio base station to set frame synchronization between said radio base stations, frame synchronization between said radio base stations is first established using a TDMA control channel, and then establishment of frame synchronization between said radio base stations in a chip rate unit of the time-divided CDMA is performed using a time-divided CDMA control channel, and then information of a displacement time from a start time position of a time-divided CDMA control signal burst received from said transmitting radio base station by said tributary base station when frame synchronization between said radio base stations is established in a chip rate unit of the time-divided CDMA to a top time position of a time-divided CDMA control signal burst transmitted from said tributary base station to said transmitting radio base station is stored into a memory of at least one of said tributary base station, or a mobile switching center which accommodates said tributary base station.

27. A mobile communication system according to claim 26, wherein after frame synchronization between said radio base stations is established in a chip rate unit of the time-divided CDMA, said tributary base station stops transmission of a time-divided CDMA control signal burst therefrom to said radio base station and adjusts top time positions of time-divided CDMA control signal bursts to be transmitted to a plurality of mobile stations in accordance with the information of the time of displacement stored in said memory from a start time position of the time-divided CDMA control signal burst received from said transmitting radio base station, and said transmitting radio base station uses a time slot, in which said radio base station has received the time-divided CDMA control signal from said tributary base station, as a speech channel to down-links to said plurality of mobile stations, and transmits a time-divided CDMA speech signal burst.

28. A mobile communication system according to claim 27, wherein after frame synchronization between said radio base stations is established in a chip rate unit of the time-divided CDMA, when, while said radio base station uses a time slot, with which said radio base station has received a time-divided CDMA control signal from said tributary base station, as a speech channel for a down-link to a plurality of mobile stations, a call request to the mobile station which has used the down-link disappears, transmission of a time-divided CDMA speech signal burst to the mobile station is stopped in the time slot, and reception of a time-divided CDMA control signal burst from said tributary base station is resumed to effect frame synchronization establishment between said radio base stations.

29. A mobile communication system according to claim 26, wherein when one of said radio base stations tries to establish frame synchronization with another one of said radio base stations, frame synchronization between the radio base stations is established first using a TDMA control channel, and then it is discriminated whether or not use of a time-divided CDMA control channel is allowed, and if use of a time-divided CDMA control channel is not allowed, then frame synchronization between the radio base stations using the TDMA control channel is repeated, and, after use of the time-divided CDMA control channel becomes allowed, establishment of frame synchronization between the radio base stations is performed in a chip rate unit of the time-divided CDMA using the time-divided CDMA control channel.

30. A mobile communication system according to claim 22, wherein said transmitting radio base station has a function of transmitting, when synchronization information is to be propagated from said radio base station to a plurality of tributary base stations, one or both of a TDMA control signal burst and a time-divided CDMA control signal burst by one or both of a TDMA control channel and a time-divided CDMA control channel, and wherein each of said tributary base stations has a function of transmitting a TDMA control signal burst or a time-divided CDMA control signal burst by a TDMA control channel or a time-divided CDMA control channel when synchronization information is to be propagated from a respective tributary base station to said radio base station.

* * * * *

UNITED STATES PATENT AND TRADEMARK OFFICE
CERTIFICATE OF CORRECTION

PATENT NO. : 6,219,347 B1  
DATED : April 17, 2001  
INVENTOR(S) : Uchida et al.

It is certified that error appears in the above-identified patent and that said Letters Patent is hereby corrected as shown below:

<u>Title page,</u>
"§371 Date: Dec. 2, 1999" should be -- §371 Date: Feb. 12, 1999 --.
"§102(e) Date: Dec. 2, 1999" should be -- §102(e) Date: Feb 12, 1999 --.

<u>Column 3,</u>
Line 16, "GPSP" should be -- GPS --.

<u>Column 34, claim 2,</u>
Line 22, "sad" should be -- said --.

Signed and Sealed this

Ninth Day of April, 2002

Attest:

Attesting Officer

JAMES E. ROGAN
*Director of the United States Patent and Trademark Office*